United States Patent
Manda Venkata Naga et al.

(10) Patent No.: US 11,534,728 B2
(45) Date of Patent: Dec. 27, 2022

(54) REDUCTANT NOZZLE WITH HELICAL CHANNEL DESIGN

(71) Applicant: Caterpillar Inc., Deerfield, IL (US)

(72) Inventors: Satya Ramakrishna Manda Venkata Naga, Dunlap, IL (US); Kevin L. Martin, Washburn, IL (US); Paul Arthur Zwart, Dunlap, IL (US); Andrew M. Denis, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 344 days.

(21) Appl. No.: 16/192,671

(22) Filed: Nov. 15, 2018

(65) Prior Publication Data

US 2020/0156024 A1    May 21, 2020

(51) Int. Cl.
| | | |
|---|---|---|
| *B05B 7/04* | (2006.01) | |
| *B05B 7/10* | (2006.01) | |
| *B01F 25/313* | (2022.01) | |
| *F01N 13/08* | (2010.01) | |
| *F01N 3/20* | (2006.01) | |
| *B01D 53/94* | (2006.01) | |
| *B01D 53/18* | (2006.01) | |

(52) U.S. Cl.
CPC ...... *B01F 25/3131* (2022.01); *B01F 25/3133* (2022.01); *B05B 7/0466* (2013.01); *B05B 7/10* (2013.01); *B01D 53/185* (2013.01); *B01D 53/9431* (2013.01); *F01N 3/2066* (2013.01); *F01N 13/08* (2013.01); *F01N 2610/02* (2013.01); *F01N 2610/1453* (2013.01)

(58) Field of Classification Search
CPC ....... B05B 7/0466; B05B 7/10; B05B 7/0475; B05B 7/0892; B05B 7/066; B01F 5/0451; B01F 5/0461; B01F 5/04; B01F 5/045; B01F 25/3131; B01F 25/3133; B01D 53/185
USPC ................ 239/265.17, 265.19, 127.1, 127.3
See application file for complete search history.

(56) References Cited

U.S. PATENT DOCUMENTS

| | | | |
|---|---|---|---|
| 3,493,181 A | | 2/1970 | Goodnight et al. |
| 3,790,086 A | * | 2/1974 | Masai ........................ B05B 7/10 239/406 |
| 4,546,923 A | * | 10/1985 | Ii ............................. B05B 7/066 239/406 |
| 5,732,885 A | | 3/1998 | Huffman |
| 6,267,301 B1 | | 7/2001 | Haruch |
| 6,334,579 B1 | * | 1/2002 | Zarbi .................... B05B 7/0475 239/405 |
| 7,117,678 B2 | * | 10/2006 | Sampath ................... F02C 1/00 60/740 |

(Continued)

FOREIGN PATENT DOCUMENTS

| | | | | |
|---|---|---|---|---|
| KR | 20160106414 A | | 9/2016 | |
| WO | WO2014205255 | * | 12/2014 | ........... B05B 7/0466 |

*Primary Examiner* — Christopher R Dandridge
(74) *Attorney, Agent, or Firm* — Hibshman Claim Construction PLLC

(57) ABSTRACT

A nozzle including a first end and a second end. The first end includes at least a first inlet and a second inlet and the second end includes a plurality of outlets. An exterior surface extends from the first end to the second end of the nozzle. A plurality of vanes are disposed on the exterior surface and extend from the first end to the second end of the nozzle. A plurality of channels form along the exterior surface of the nozzle.

12 Claims, 15 Drawing Sheets

(56) References Cited

U.S. PATENT DOCUMENTS

| | | | |
|---|---|---|---|
| 8,348,180 B2 * | 1/2013 | Mao | F23R 3/14 |
| | | | 239/404 |
| 8,549,842 B2 * | 10/2013 | Park | F01N 3/2066 |
| | | | 60/289 |
| 2004/0222317 A1 | 11/2004 | Huffman | |
| 2009/0226362 A1 | 9/2009 | Randolph, III et al. | |
| 2014/0102084 A1 | 4/2014 | Toshev et al. | |
| 2015/0028132 A1 | 1/2015 | Vidusek et al. | |
| 2015/0167525 A1 | 6/2015 | Assalve et al. | |
| 2016/0108838 A1 | 4/2016 | Inoue | |
| 2017/0128884 A1 | 5/2017 | Goffe | |

* cited by examiner

REDUCTANT NOZZLE WITH HELICAL CHANNEL DESIGN

TECHNICAL FIELD

The present disclosure is directed to an exhaust treatment system and, more particularly, to a nozzle that injects a reductant solution into a fluid path within an exhaust treatment system.

BACKGROUND

Internal combustion engines, such as diesel engines, gasoline engines, gaseous fuel-powered engines, and other engines known in the art, exhaust a complex mixture of components. These components may include nitrogen oxides ($NO_x$), such as NO and $NO_2$. Due to an increased focus on avoiding environmental pollution, exhaust emission standards are becoming more stringent, and the amount of $NO_x$ emitted from engines may be regulated depending on engine size, engine class, and/or engine type. To ensure compliance with the regulation of these compounds, as well as reduce harmful effects on the environment, some engine manufacturers have implemented a strategy called Selective Catalytic Reduction (SCR). SCR is a process where gaseous and/or liquid reductant, most commonly urea (($NH_2$)2CO), is selectively added to engine exhaust using one or more nozzles. The injected reductant decomposes into ammonia ($NH_3$), reacts with the $NO_X$ in the exhaust, and forms water ($H_2O$) and diatomic nitrogen ($N_2$).

U.S. Patent Application Publication No. 2016/0108838 to Inoue, published on Apr. 21, 2016 (hereinafter referred to as the '838 reference), describes a spray nozzle designed to suppress the deposit and growth of urea. The nozzle of the '838 reference includes an opening from which pressurized air is discharged. The discharged pressurized air advances from the opening along a lateral surface of the nozzle, and reaches the injection port where a urea solution exits the nozzle. The '838 reference explains that the pressurized air acts to remove the urea solution from the nozzle, and in doing so, minimizes buildup of the urea solution near the injection port.

While the spray nozzle of the '838 reference may attempt to suppress the growth of urea at ports of the nozzle, the suppression may be suboptimal. For instance, the lateral surface of the '838 reference is curved and external to the nozzle. Such an external surface may fail to channel or otherwise direct at least some of the pressurized air towards the urea solution ejection port. As a result, the urea solution may build up at the nozzle tip and potentially clog the ejection port, hindering performance of the nozzle. Additionally, because the pressurized air siphons air away from an air supply that mixes with the urea, the amount of air available for mixing with the urea solution or a velocity of the air that mixes with the urea, may be reduced. As a result, atomization of the urea within the nozzle may be hindered. Further, the '838 reference describes a nozzle having multiple distinct and assembled parts, and such a nozzle configuration may increase the size, complexity, assembly time, and/or manufacturing cost of the nozzle.

Example embodiments of the present disclosure are directed toward overcoming one or more of the deficiencies described above.

SUMMARY OF THE INVENTION

In an example embodiment of the present disclosure, a nozzle comprises a first end having a first inlet and a second inlet, a second end having a plurality of outlets, an exterior surface that extends from the first end of the nozzle to the second end of the nozzle, a plurality of vanes disposed on the exterior surface and at least one vane of the plurality of vanes extends from the first end of the nozzle to the second end of the nozzle. The plurality of vanes may include sidewalls and a radially outermost surface. The nozzle further comprises a housing including a first end, a second end, and an interior surface extending from the first end of the housing to the second end of the housing and coupling to the radially outermost surface of individual vanes of the plurality of vanes. A plurality of channels are disposed around the exterior surface of the nozzle, where the plurality of channels may be defined at least in part by a first sidewall of a first vane of the plurality of vanes, a second sidewall of a second vane of the plurality of vanes opposite the first sidewall, the exterior surface of the nozzle, and the interior surface of the housing.

In another example embodiment of the present disclosure, a nozzle comprises a first end including a first inlet and a second inlet, a second end including a plurality of outlets, an exterior surface extending from the first end to the second end, and a plurality of vanes disposed on the exterior surface. The plurality of vanes may extend from the first end to the second end and each vane of the plurality of vanes forms part of a respective channel of a plurality of channels along the exterior surface of the nozzle.

In yet another example embodiment of the present disclosure, an exhaust system includes an exhaust pipe configured to receive exhaust from an engine, a nozzle located within the exhaust pipe, and a supply line fluidly connected to the nozzle to supply reductant and air to the nozzle. The nozzle includes a first end, a second end, an exterior surface extending from the first end to the second end, a plurality of spray outlets located at the second end, and a plurality of vanes disposed along the exterior surface and extending radially outwardly from the exterior surface. The plurality of vanes may extend from the first end to the second end of the nozzle and individual vanes of the plurality of vanes form part of a respective channel of a plurality of channels disposed along the exterior surface of the nozzle. The plurality of vanes may helically extend from the first end to the second end of the nozzle about a central longitudinal axis of the nozzle.

DETAILED DESCRIPTION

This disclosure generally relates to nozzles useful for injecting a mixture of reductant and air into an exhaust stream. Wherever possible, the same reference number(s) will be used through the drawings to refer to the same or like features. In the figures, the left-most digit(s) of a reference number identifies the figure in which the reference number first appears.

Figure 1:
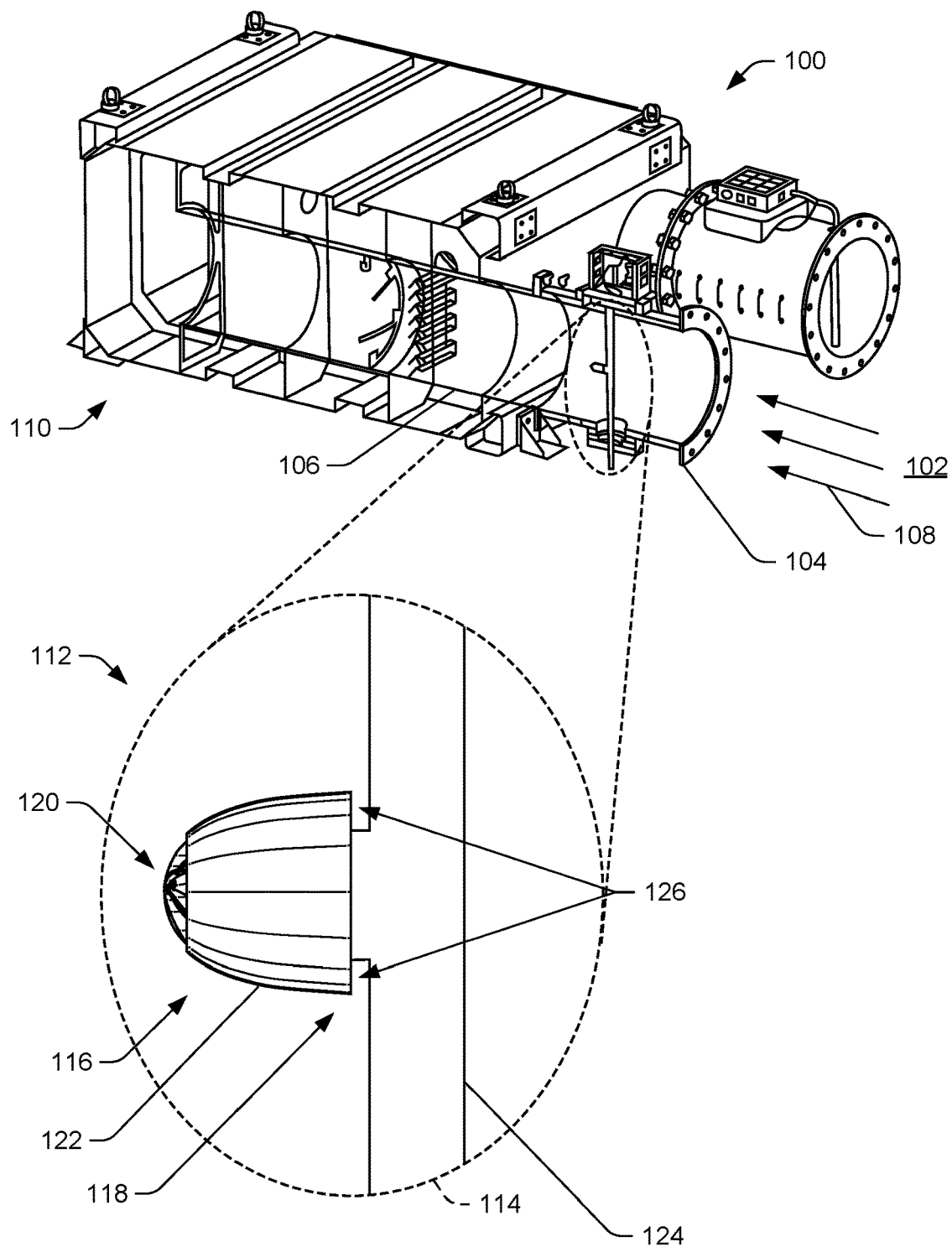
FIG. 1 is a perspective view of an exhaust treatment system, showing an example nozzle and an example nozzle housing in accordance with an example embodiment of the present disclosure.

FIG. 1 illustrates an example exhaust system 100. For the purposes of this disclosure, the exhaust system 100 is depicted and described in use with a diesel-fueled, internal combustion engine. However, it is contemplated that the exhaust system 100 may embody any exhaust system useable with any other type of combustion engine such as, a gasoline or a gaseous fuel-powered engine, or an engine fueled by compressed or liquefied natural gas, propane, or methane.

The example exhaust system 100 includes components that condition byproducts of combustion. For example, exhaust 102 may be produced by an engine (not shown) and may enter the exhaust system 100 via an exhaust inlet 104 of an exhaust pipe 106. Upon entering the exhaust system 100, the exhaust 102 may pass within the exhaust pipe 106 in the direction of arrows 108, and may exit the exhaust system 100 via an exhaust outlet 110.

The exhaust system 100 may include a treatment system 112 that removes regulated constituents from the exhaust 102 and/or acts on such regulated constituents. That is, within the exhaust pipe 106, the exhaust 102 may undergo one or more treatment processes. For example, the treatment processes may include a conversion of NO to $NO_2$.

A portion of the treatment system 112 is shown in greater detail in the enlarged view 114. Among other components, the treatment system 112 may include a nozzle 116 configured to spray a reductant solution into the exhaust 102. The nozzle 116 may include a first end 118 and a second end 120. The first end 118 of the nozzle 116 may be fluidly upstream from the second end 120 of the nozzle 116.

In some instances, the nozzle 116 may reside within a nozzle housing 122. As shown in FIG. 1, the second end 120 of the nozzle 116 may protrude through an opening in the nozzle housing 122 such that the second end 120 of the nozzle 116 may be exposed to exhaust 102 external to the nozzle housing 122.

The example treatment system 112 may also include a supply line 124. The nozzle 116 may fluidly connect to the supply line 124 at the first end 118 of the nozzle 116 and via one or more fittings or couplers. For instance, the first end 118 of the nozzle 116 may include one or more inlets or ports configured to receive reductant and/or air from the supply line 124. The supply line 124 may support the nozzle 116 at any location (e.g., a fixed location) within an inner passage formed by the exhaust pipe 106. In some examples, the nozzle 116 may be disposed substantially centrally within the exhaust pipe 106. In other examples, the nozzle 116 may be disposed proximate and/or adjacent to a wall of the exhaust pipe 106 (e.g., proximate and/or adjacent to a wall forming the inner passage of the exhaust pipe 106).

The supply line 124 may be configured to feed the nozzle 116 with fluid and/or gas useful in treating the exhaust 102. In some examples, the supply line 124 may include multiple distinct supply lines (e.g., the supply line 124 may comprise a double pipe) such as a compressed air line, and a reductant supply line that may be separate from the compressed air line. In such examples, the compressed air line may supply compressed air to the nozzle 116 and the reductant supply line may supply reductant to the nozzle 116. In some examples, the reductant received by the nozzle 116 may include a gaseous or liquid reductant. For example, the reductant may be ammonia gas, liquefied anhydrous ammonia, ammonium carbonate, an ammine salt solution, or a hydrocarbon such as diesel fuel, capable of being sprayed or otherwise advanced by the nozzle 116 and into the exhaust 102. The treatment system 112 may also include a compressor (not shown) configured to supply compressed air via the supply line 124, and one or more reservoirs and pumps (not shown) configured to supply reductant via the supply line 124. In some embodiments, an amount of compressed air and/or an amount of reductant supplied may depend on a flow rate of the exhaust 102, an operational state of the engine (e.g., rpm), a temperature of the exhaust 102, a concentration of $NO_x$ in the exhaust 102, and/or one or more other operating conditions of the treatment system 112 or of the engine. For example, as the flow rate of the exhaust 102 decreases, a controller or other control component (not shown) operably connected to the pump may control the pump to commensurately decrease the amount of reductant and/or air supplied to the nozzle 116 (and thereby introduced into the exhaust 102). Alternatively, as the flow rate of the exhaust 102 increases, the controller or other control component may increase the amount of reductant and/or air supplied to the nozzle 116.

In some embodiments, the nozzle 116 may be located downstream from a selective SCR system within the exhaust system 100 and/or other treatment systems. Further, the exhaust system 100 and/or treatment system 112 may include one or more oxidation catalysts, mixing features, particulate filters (e.g., diesel particulate filter (DPF)), SCR substrates, ammonia reduction catalysts, and other devices configured to further enhance the effectiveness of reducing $NO_X$. While only one nozzle 116 is shown coupled to the supply line 124, in some embodiments, the exhaust system 100 and/or the treatment system 112 may include more than one nozzle 116. Additionally, the second end 120 of the nozzle 116 may be oriented such that the reductant solution may disperse substantially in-line with and/or substantially in the same direction as the flow of the exhaust 102 within the exhaust pipe 106. The nozzle(s) 116 may also be disposed to inject reductant solution into the exhaust 102 along a substantially straight section of the exhaust system 100 (e.g., within a substantially straight section of the exhaust pipe 106) to improve mixing of the reductant solution with the exhaust 102 and/or to increase the level of reaction between the reductant solution and $NO_x$ in the exhaust 102. Moreover, the exhaust system 100 and/or the treatment system 112 may include more than one supply line 124, and the exhaust system 100 may include any number of exhaust pipes 106 having one or more nozzles 116 and/or one or more supply lines 124 positioned therein.

In some examples, the nozzle 116 may include one or more channels 126 that extend between the first end 118 and the second end 120. In such examples, at least one of the channels 126 may extend from the first end 118 to the second end 120 of the nozzle 116. As will be described in greater detail below with respect to at least FIGS. 2 and 3, the nozzle 116 may include a plurality of vanes having sidewalls and a radially outermost surface disposed away from an exterior surface of the nozzle 116. The one or more channels 126 may be configured to receive exhaust 102 proximal to the first end 118 of the nozzle 116. For instance, FIG. 1 illustrates that the first end 118 of the nozzle 116 may include a width that may be larger than a width of the supply line 124, or a location at which the first end 118 of the nozzle 116 fluidly couples to the supply line 124. Thus, the exhaust 102 may enter the channels 126 at the first end 118 of the nozzle 116, may flow within the channels 126 and along the exterior surface of the nozzle 116. The exhaust 102 may exit the channels 126 adjacent to the second end 120 of the nozzle 116. In some embodiments, the channels 126 may be helical from the first end 118 of the nozzle 116 to the second end 120 of the nozzle 116 about a central longitudinal axis of the nozzle 116 (FIGS. 2-6). In some examples, one or more of the channels 126 may have a first cross-sectional area at a first location proximate the first end 118 of the nozzle 116, and a second cross-sectional area less than the first cross-sectional area at a second location proximate the second end 120 of the nozzle 116.

As discussed in detail herein, the nozzle 116 may be configured to facilitate mixing of reductant and air to atomize the reductant. The nozzle 116 may also be configured to disperse a solution of reductant and air into the exhaust 102 from the second end 120 of the nozzle 116. More particularly, within the nozzle 116, air and reductant may mix together through reductant impinging against an impinging surface. This process may cause the reductant to break up the into fine particles or droplets. The nozzle 116 may also be formed and/or otherwise configured to direct supplied air to mix with the reductant particles within the nozzle 116, which may further facilitate atomization of reductant. In such examples, air and reductant may mix within the nozzle 116 to form the reductant solution. The nozzle 116 may also be configured to disperse and/or otherwise direct the reductant solution into the exhaust 102 through outlets disposed at the second end 120 of the nozzle 116. Accordingly, as the reductant solution disperses into the exhaust 102, the reductant solution may react with $NO_x$ (e.g., NO and/or $NO_2$) in the exhaust 102 to form water ($H_2O$) and elemental nitrogen ($N_2$).

In some embodiments, the outlets at the second end 120 of the nozzle 116 (or channels that feed the outlets) may be helical to further enhance mixing of the air and the reductant, impart a circular flow to the reductant solution exiting the nozzle 116, or to vary a plume size of the reductant solution within the exhaust 102. In some examples, the reductant solution may disperse in a substantially conical-shaped plume from the second end 120 of the nozzle 116. Additionally, as will be described in greater detail herein, the channels 126 and the exhaust 102 that flows through the channel 126, may assist in removing excess reductant from the second end 120 of the nozzle 116, thereby preventing reductant from crystalizing and clogging the outlets.

In some embodiments, the nozzle 116 and/or the nozzle housing 122 may be manufactured using 3D printing techniques or other types of additive manufacturing (e.g., cast molding). However, it is contemplated that one more of the components of the nozzle 116 discussed above could alternatively manufactured from other processes. Additionally, the nozzle 116 and/or the nozzle housing 122 may be manufactured from a plurality of materials, including chromium, nickel, stainless steel, alloys, ceramics, etc. The materials may also be anti-corrosive and anti-stick materials to prevent a build-up of the reductant on and/or within the nozzle 116.

Figure 2:
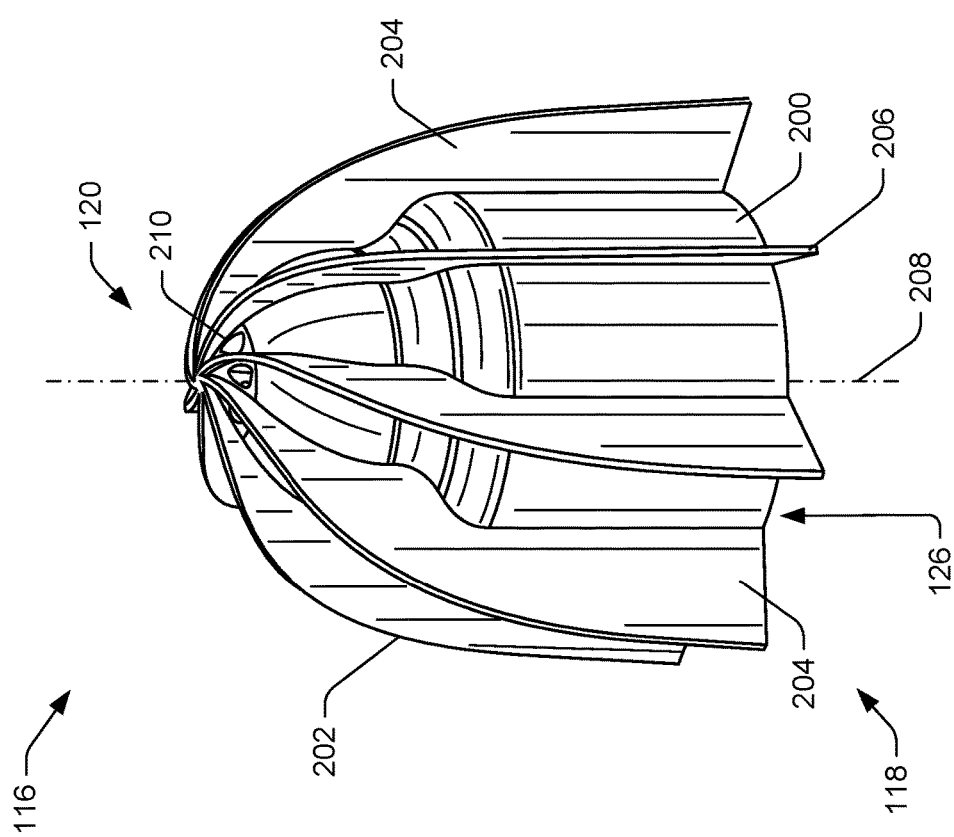
FIG. 2 is a top perspective view of the nozzle of FIG. 1 in accordance with an example embodiment of the present disclosure.

FIG. 2 illustrates a top perspective view of the nozzle 116 with the nozzle housing 122 omitted for clarity. An exterior surface 200 of the nozzle 116 may extend between the first end 118 of the nozzle 116 and the second end 120 of the nozzle 116. The exterior surface 200 may be a continuous smooth surface with rounded corners and edges. As shown in FIG. 2, in some examples, the exterior surface 200 at the first end 118 of the nozzle 116 may be substantially cylindrically-shaped while exterior surface 200 at the second end 120 of the nozzle 116 may be substantially conical shaped or substantially domed shaped. As such, in some example embodiments, the first end 118 of the nozzle 116 may have a first cross-sectional area, and the second end 120 of the nozzle 116 may have a second cross-sectional area less than the first cross-sectional area of the first end 118 of the nozzle 116.

The nozzle 116 may include one or more vanes 202 that extend radially from the exterior surface 200. One or more of the vanes 202 may extend along the exterior surface 200 from the first end 118 of the nozzle 116 to the second end 120 of the nozzle 116. The vanes 202 may include first and second (e.g., opposing) sidewalls 204, and a radially outermost surface 206 disposed away from the exterior surface 200 of the nozzle 116. The sidewalls 204 may extend from the exterior surface 200 of the nozzle 116 to the radially outermost surface 206. As shown in FIG. 2, the vanes 202 may helically extend (e.g., extend in a spiraling, curved, and/or otherwise substantially helical manner or direction) from the first end 118 of the nozzle 116 to the second end 120 of the nozzle 116 along a direction of a longitudinal axis 208 of the nozzle 116. The longitudinal axis 208 may be centrally located within the nozzle. In doing so, the radially outermost surface 206 of individual vanes 202 may converge to or towards the longitudinal axis 208 at the second end 120. Additionally, the vanes 202 may include a helical length along which the sidewalls 204 extend. That is, the sidewalls 204 may extend, in a substantially helical manner or direction, from the first end 118 to the second end 120, in the direction of the longitudinal axis 208, and along the length of the vanes 202.

The vanes 202 may define at least a portion of one or more of the channels 126. As shown in FIG. 2, the channels 126 may comprise a plurality of angled or curved helical flow channels that extend from the first end 118 of the nozzle 116 to the second end 120 of the nozzle 116 along the longitudinal axis 208 of the nozzle 116. The channels 126 may form a plurality of pathways through which a portion of the exhaust 102 may flow. The channels 126 may be formed between adjacent vanes 202. That is, individual channels 126 may be disposed between the sidewalls 204 of adjacent vanes 202. In other words, the individual channels 126 may be disposed between vanes 202 that are located next to one another on the exterior surface. As noted above, one or more of the channels 126 may extend from the first end 118 of the nozzle 116 to the second end 120 of the nozzle 116, and as the radially outermost surfaces 206 of the vanes 202 converge at the second end 120 of the nozzle 116, a distance between adjacent sidewalls 204 may decrease. In doing so, a cross-sectional area of the channels 126 at the first end 118 of the nozzle may be larger than a cross-sectional area of the channels 126 at the second end 120 of the nozzle 116. Stated alternatively, a distance between adjacent sidewalls 204 of adjacent vanes 202 may decrease as the vanes 202 extend in a direction of the longitudinal axis 206 and along the exterior surface 200 of the nozzle 116 from the first end 118 to the second end 120 of the nozzle 116.

The second end 120 of the nozzle 116 may include one or more spray channel outlets 210 for dispersing reductant solution into the exhaust 102. The spray channel outlets 210 may be formed on the exterior surface 200 of the nozzle 116. Individual spray channel outlets 210 may be disposed between adjacent sidewalls 204 of adjacent vanes 202. In some embodiments, the spray channel outlets 210 may be substantially evenly distributed about the longitudinal axis 208 of the nozzle 116 (e.g., a central longitudinal axis). As will be described below, the nozzle 116 may include respective flow passages and/or channels to direct reductant solution from within an interior cavity of the nozzle 116 to one or more of the spray channel outlets 210.

The helical nature of the channels 126 (or the vanes 202) may assist in eliminating a buildup reductant solution or reductant byproducts near or at the second end 120 of the nozzle 116 and/or at the spray channel outlets 210. That is, when exhaust temperatures, exhaust velocities, and/or reductant spray velocities are low, droplets of reductant solution may buildup at the second end 120 of the nozzle 116 and/or within the spray channel outlets 210. Formation of such deposits, if left untreated, may be an irreversible process, and may block reductant solution from flowing out of clogged spray channel outlets 210. The blockage may hinder the $NO_x$ conversion process. Accordingly, the channels 126 may divert a flow of the exhaust 102 to generate a vortex of exhaust 102 that passes across the second end 120 of the nozzle 116.

In some instances, because the second end 120 of the nozzle 116 may include a smaller cross-sectional area than the first end 118 of the nozzle 116, an area of low pressure (e.g., a stagnant area) may form adjacent to the second end 120 of the nozzle 116. This area of low pressure may cause the reductant solution to buildup at the second end 120 and/or within the spray channel outlets 210. The flow of exhaust 102 through the channels 126 may create a venturi effect as the exhaust 102 flows over the spray channel outlets 210, thereby acting to draw reductant solution out of the spray channel outlets 210 to reduce crystallization that may occur within and/or on the nozzle 116.

Additionally, the reduction in cross-sectional area of the channels 126 may increase a velocity of the exhaust 102 that flows within the channels 126. The reduction in cross-sectional area may assist in reducing or eliminating buildup of reductant within and/or on the nozzle 116. That is, in instances where the flow of exhaust 102 may be low, the helical nature and reduced cross-section of the channels 126 may increase a velocity of exhaust 102 passing through the channels 126. This increased velocity may assist in drawing reductant solution out of the spray channel outlets 210 and/or may substantially prohibit the reductant solution from collecting at the second end 120 of the nozzle 116. Still, in some embodiments, the configuration of the channels 126 may induce a swirling action into the exhaust 102 and about the longitudinal axis 208 of the nozzle 116. This swirling action may increase an atomization of reductant as the reductant solution exits the spray channel outlets 210.

Figure 3:
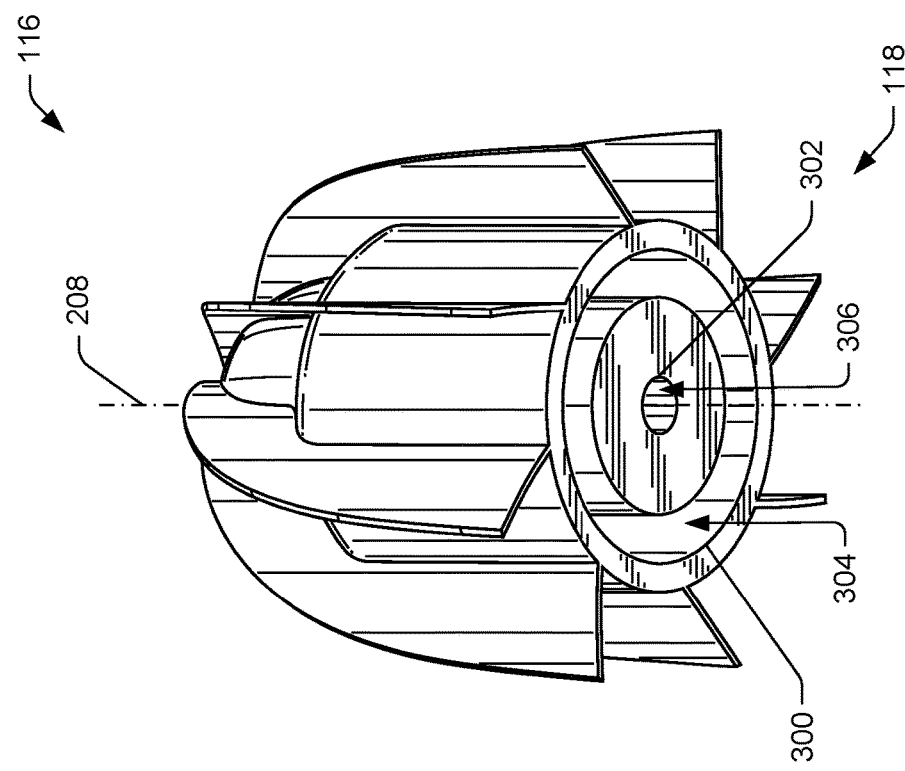
FIG. 3 is a bottom perspective with of the nozzle of FIG. 1 in accordance with an example embodiment of the present disclosure.

FIG. 3 illustrates a bottom perspective view of the nozzle 116, showing the first end 118 of the nozzle 116 in more detail. The first end 118 may include an air channel inlet 300 configured to receive air from the supply line 124 and a reductant channel inlet 302, that is separate from the air channel inlet 300, configured to receive reductant from the supply line 124. As shown, the air channel inlet 300 and the reductant channel inlet 302 may be substantially annular fluid inlets defined by the nozzle 116. For example, the air channel inlet 300 may extend substantially around the reductant channel inlet 302 and may substantially resemble a ring or annulus that encircles (e.g., is concentric with) the reductant channel inlet 302. The reductant channel inlet 302 may be substantially centrally located within the nozzle 116, and may be substantially concentric with the longitudinal axis 208 of the nozzle 116.

In some examples, the air channel inlet 300 may fluidly connect to an air channel 304 defined by the nozzle 116. The air channel inlet 300 may be configured to supply the air channel 304 with air received from the supply line 124. Further, the reductant channel inlet 302 may fluidly connect to a reductant channel 306 defined by the nozzle 116. In such examples, the reductant channel inlet 302 may be configured to supply the reductant channel 306 with reductant received by the supply line 124. In example embodiments, the air channel 304 and/or the reductant channel 306 may extend from the first end 118 of the nozzle 116 towards the second end 120 of nozzle 116 to direct air and reductant, respectively, into an interior cavity of the nozzle 116. Within the interior cavity, air and reductant may mix to form the reductant solution described above. The reductant solution may be directed to exit the second end 120 of the nozzle 116 through the one or more spray channel outlets 210. The first end 118 of the nozzle 116 may be configured to couple the nozzle 116 to the supply line 124 via threads included in the first end 118, via a snap fit, via a compression fitting, and/or via one or more of the couplers described above.

Figure 4:
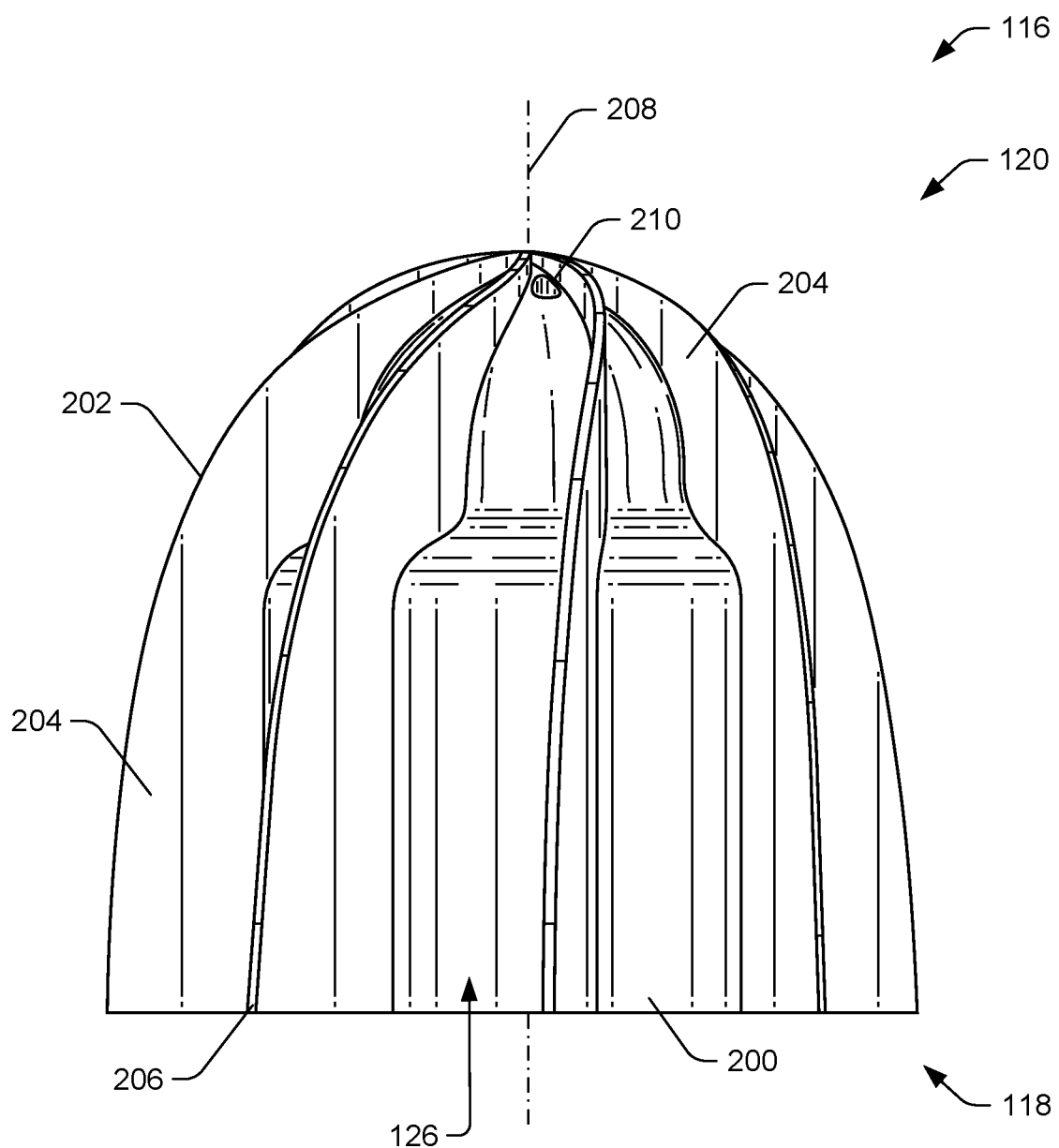
FIG. 4 is a side view of the nozzle of FIG. 1 in accordance with an example embodiment of the present disclosure.

FIG. 4 illustrates a side view of the nozzle 116. As shown, the nozzle 116 may be substantially symmetrical about the longitudinal axis 208. As discussed above, the exterior surface 200 at the first end 118 of the nozzle 116 may be substantially cylindrically-shaped and the exterior surface 200 at the second end 120 of the nozzle 116 may be substantially conical shaped, substantially domed shaped, and/or any other configuration. Further, FIG. 4 illustrates that a dimension (e.g., a width or diameter) of the nozzle 116 may reduce in size from the first end 118 to the second end 120.

The vanes 202 are shown extending radially outwardly from the exterior surface 200 of the nozzle 116. As noted above, the vanes 202 may include first and second sidewalls 204 that extend from the exterior surface 200 of the nozzle 116 to the radially outermost surface 206 of the vanes 202. The radially outermost surface 206 of the vanes 202 may define an outer periphery of the nozzle 116. As shown, the outer periphery may resemble a substantially frustoconical shape, a substantially half-dome shape, a substantially conical shape, and/or any combination thereof.

The respective radially outermost surfaces 206 of two or more of the vanes 202 may converge along the longitudinal axis 208 at the second end 120 of the nozzle 116. Disposed between adjacent sidewalls 204 of the vanes 202 may be individual spray channel outlets 210 for dispersing reductant solution into the exhaust 102. Additionally, in some embodiments, a height of the respective sidewalls 204, as measured in a direction extending radially outwardly from the exterior surface 200 of the nozzle 116 to the respective radially outermost surfaces 206 of the vanes 202, may decrease as the vanes 202 extend from the first end 118 of the nozzle 116 to the second end 120 of the nozzle 116 in a direction of the longitudinal axis 208. That is, in a directional along the longitudinal axis 208, at the first end 118 of the nozzle 116 the radially outermost surface 206 of the vane 202 may be disposed at a first radial distance from the exterior surface 200, and at the second end 120 of the nozzle 116, the radially outermost surface 206 of the same vane 202 may be disposed at a second radial distance from the exterior surface 200 that is less than the first distance.

The converging of the vanes 202 may channel the exhaust 102 to the second end 120 of the nozzle 116. The exhaust 102 may pass over the spray channel outlets 210 and remove reductant solution or help disperse the reductant solution into the exhaust pipe 106. Further, because the channels 126 reduce in cross-sectional area, a velocity of the exhaust 102 passing through the channels 126 may increase as the exhaust 102 flows through the channels 126 from the first end 118 to the second end 120 of the nozzle 116. The increase in velocity may help remove reductant solution from the nozzle 116, generally, and may prevent clogging of the spray channel outlets 210 caused by a buildup of the reductant solution proximate the respective spray channel outlets 210. Additionally, the helical configuration of the channels 126 may reduce buildup of the reductant solution within and/or on the nozzle 116. As shown, individual channels 126 may be disposed between a sidewall 204 of a first vane 202 and a sidewall 204 of a second vane 202, where the sidewall 204 of the first vane 202 and the sidewall 204 of the second vane 202 face one another.

Figure 5:
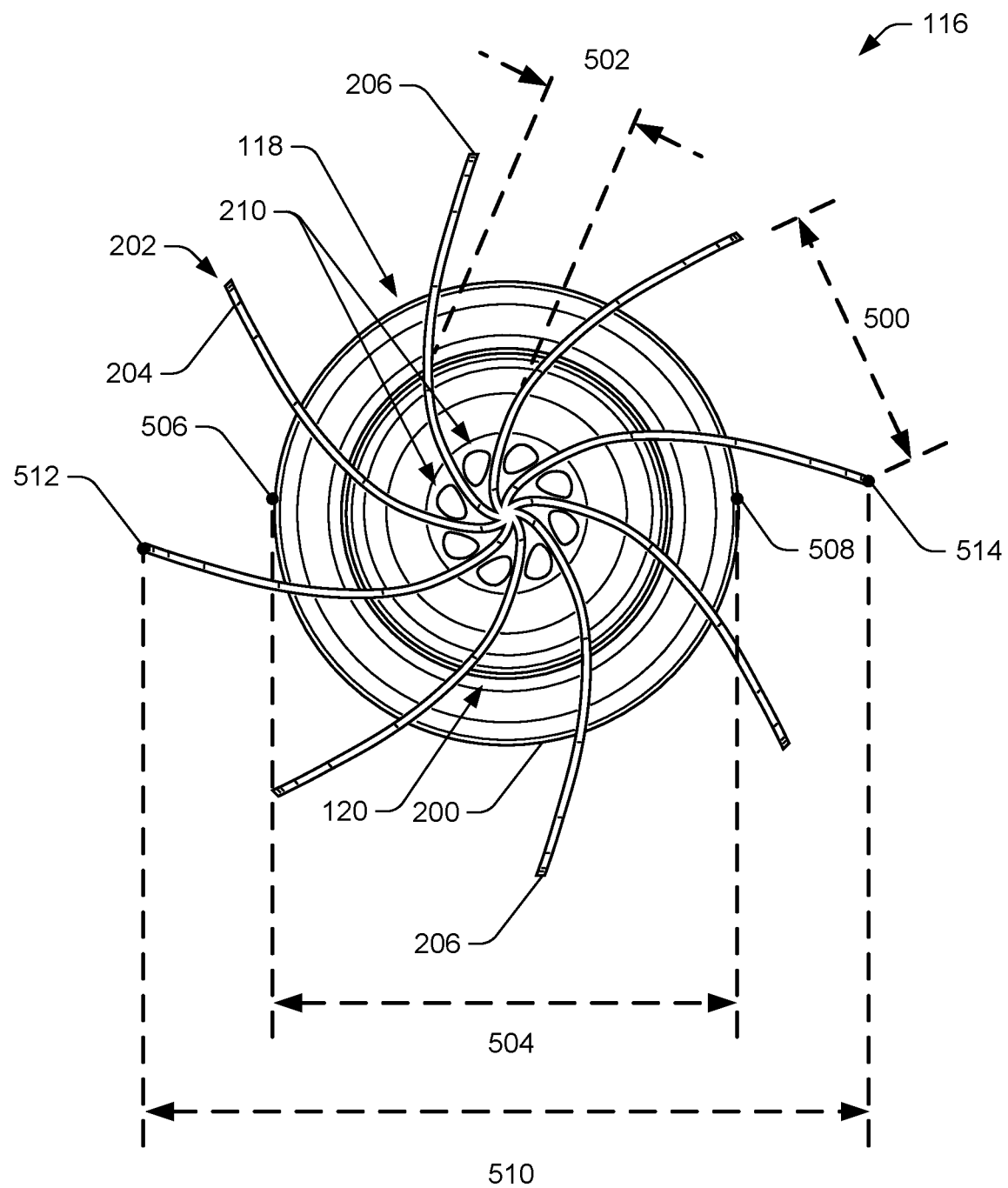
FIG. 5 is a top view of the nozzle of FIG. 1 in accordance with an example embodiment of the present disclosure.

FIG. 5 illustrates a top view of the nozzle 116 as seen from the second end 120. The second end 120 may include the spray channel outlets 210 for dispersing reductant solution into the exhaust 102. The spray channel outlets 210 may include a plurality of cross-sectional shapes or dimensions. For example, the spray channel outlets 210 may be substantially conical, substantially circular, substantially trapezoidal, substantially square, substantially rectangular, substantially ovular, and/or any other shape. In some example embodiments, the spray channel outlets 210, and/or spray channels/passages that are formed internal to the nozzle 116 that direct the reductant solution to the spray channel outlets 210, may be helical, angled, and/or otherwise oriented in a direction radially away from the longitudinal axis 208 at the second end 120 of the nozzle 116. That is, in some examples, the spray channel outlets 210 and/or the spray channels may be angled and/or otherwise configured to direct reductant solution away from the longitudinal axis 208 (FIG. 4) of the nozzle 116. Such a configuration may assist in dispersing the reductant solution within the exhaust 102, mixing air and reductant within the nozzle 116, and/or adjusting a size of a plume dispersed by the nozzle 116. Additionally, the helical nature of the channels that direct the reductant solution to the spray channel outlets 210 may cause the reductant solution to exit the nozzle 116 in a swirling motion about the longitudinal axis 208.

In some examples, the spray channel outlets 210 may be substantially evenly distributed and/or radially-spaced around the second end 120 and about the longitudinal axis 208 (FIG. 4). Additionally, individual spray channel outlets 210 may be diametrically opposed from one another such that reductant solution may substantially uniformly disperse into the exhaust 102 (FIG. 1). Additionally, individual spray channel outlets 210 may be disposed between adjacent vanes 202 or between adjacent sidewalls 204 of the adjacent vanes 202. Further, while FIG. 5 illustrates eight spray channel outlets 210, the nozzle 116 may include more than or less than eight spray channel outlets 210. For instance, the nozzle 116 may include twelve spray channel outlets 210 or four spray channel outlets 210.

As shown in FIG. 5, the respective radially outermost surfaces 206 of two or more of the vanes 202 may converge at the second end 120 of the nozzle 116. In some embodiments, the vanes 202 may converge along or at the longitudinal axis 208 of the nozzle 116 at the second end 120. As noted above, given that the radially outermost surface 206 of the vanes 202 may converge, a cross-sectional distance interposed between adjacent vanes 202 and/or adjacent sidewalls 204 of adjacent vanes 202 may decrease from the first end 118 to the second end 120 and in a direction along the longitudinal axis 208. For instance, FIG. 5 illustrates that at the first end 118 of the nozzle 116, the vanes 202 may be separated by a distance 500 (e.g., a distance between opposing sidewalls 204 of adjacent vanes 202). As the vanes 202 extend from the first end 118 towards the second end 120 of the nozzle 116, along the longitudinal axis 208, FIG. 5 illustrates that the vanes 202 may be separated by a distance 502 that is less than the distance 500 (e.g., a distance between opposite sidewalls 204 of adjacent vanes 202). However, while FIG. 5 illustrates the distance 502 as measured from a particular location (e.g., respective midpoints of the opposite sidewalls 204) between the first end 118 and the second end 120, it is understood that the distance 502 represents just one example distance disposed between the vanes 202 to illustrate the converging of the radially outermost surface 206 the vanes 202 at the second end 120 of the nozzle 116.

Moreover, a helical length of the vanes 202 from the first end 118 to the second end 120 of the nozzle 116 may extend at a range of degrees of rotation about the longitudinal axis 208 of the nozzle 116 (e.g., about 15 degrees, about 20 degrees, about 30 degrees, and so forth). Additionally, the vanes 202 may be helical at a constant trajectory along the longitudinal axis 208, or portions of the vanes 202 may be helical at different trajectories along the longitudinal axis 208.

The radially outermost surfaces 206 of respective vanes 202 may be spaced away from the exterior surface 200 of the nozzle 116 at the first end 118. Thus, the vanes 202 may form inlets for the channels 126. While the nozzle housing 122 has been omitted from FIG. 5 for clarity, it is understood that the nozzle housing 122 may form a portion of each of the respective channels 126 described herein. A linear distance between (e.g., extending from) the radially outermost surfaces 206 of diametrically opposed vanes 202 at the first end 118 of the nozzle 116 may be larger than a linear distance of the exterior surface 200 between two diametrically opposed points at the first end 118 of the nozzle 116. In other words, FIG. 5 illustrates a linear distance 504 disposed between a point 506, and a point 508 diametrically opposed from the point 506 on the exterior surface 200 of the nozzle 116 at the first end 118. Comparatively, a linear distance 510 may be disposed between a point 512 on the radially outermost surface 206 of a first vane 202 at the first end 118 and diametrically opposed point 514 on the radially outermost surface 206 of a second vane 202 at the first end 118. The linear distance 510 may be greater than the linear distance 510 to form the inlets for the channels 126.

FIG. 5 further illustrates that the vanes 202 may outwardly extend from the exterior surface 200 of the nozzle 116 in a curved manner relative to the longitudinal axis 208. In some examples, the vanes 202 and/or the sidewalls 204 may extend outwardly in a slightly curved fashion, oriented in a clockwise or counterclockwise direction, about the longitudinal axis 208 of the nozzle 116. The vanes 202 may curve in substantially the same amount as compared to another, and the vanes 202 may be disposed apart from one another by substantially the same amount (e.g., substantially equally spaced on the exterior surface 200 and about the longitudinal axis 208). That is, a first vane 202 and a second vane 202 may curve the substantially same amount from the first end 118 to the second end 120 of the nozzle 116, and about the longitudinal axis 208. In such examples, the channels 126 may substantially uniformly direct the exhaust 102 over the second end 120 of the nozzle 116. The vanes 202 and/or the sidewalls 204 may also have a substantially uniform thickness, and may extend radially outwardly from the exterior surface 200 of the nozzle 116 at substantially equal lengths at similar positions along the helical length of the vanes 202. Furthermore, although FIG. 5 illustrates the nozzle 116 including eight channels 126 and eight vanes 202, the nozzle 116 may include more than or less than eight channels 126 or eight vanes 202.

Figure 6:
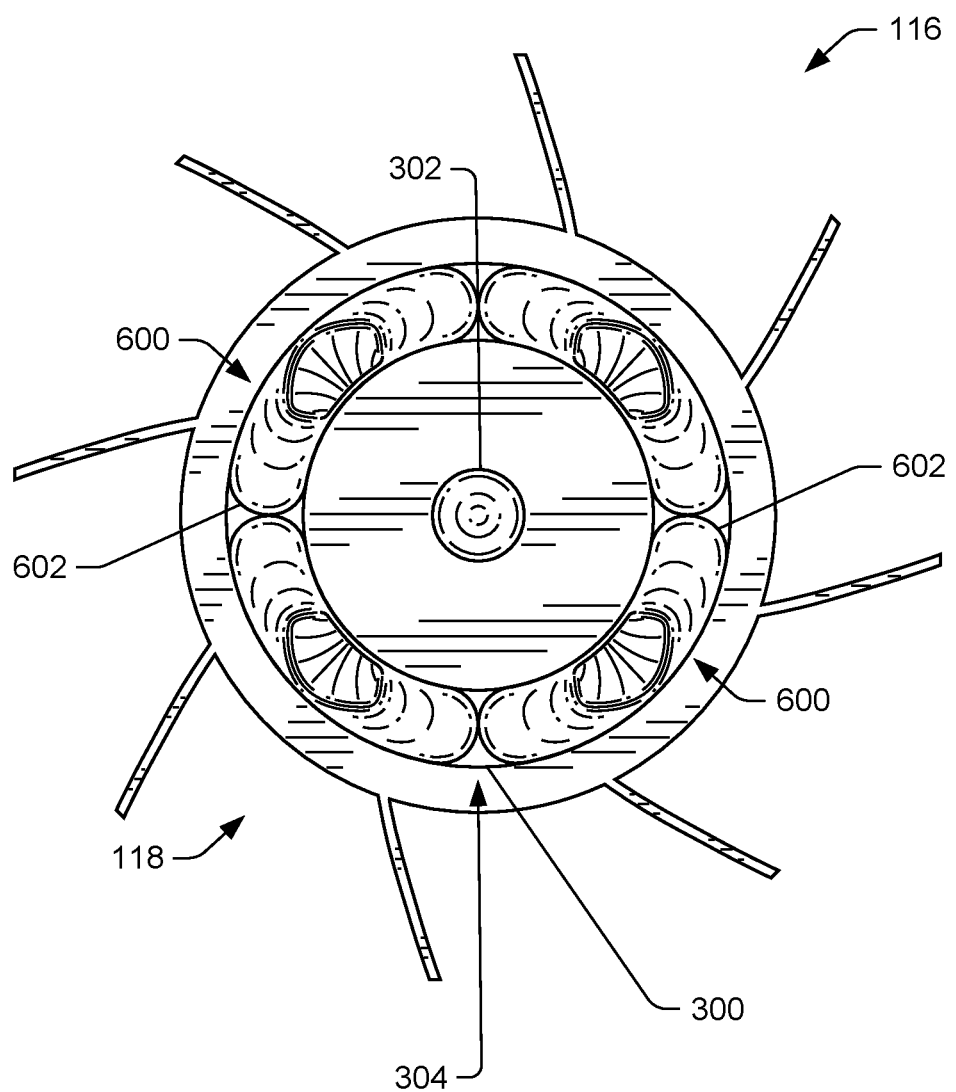
FIG. 6 is a bottom view of the nozzle of FIG. 1 in accordance with an example embodiment of the present disclosure.

FIG. 6 illustrates a bottom view of the nozzle 116 as seen from the first end 118 of the nozzle 116. As shown in FIG. 6, in some examples the air channel 304 may diverge, branch, or otherwise split into multiple air passageways 600 defined by the nozzle 116, such as four air passageways 600. That is, while FIG. 3 (described above) illustrates the air channel 304 as having a substantially cylindrical shape, the air channel 304 may extend into the nozzle 116 in a direction substantially along the longitudinal axis 208 for a predetermined length, and may branch into two or more respective air passageways 600 defined by the nozzle 116. Each of the air passageways 600 may include a corresponding air passageway inlet 602 defined by the nozzle 116 and may be configured to receive air from the air channel 304. In some example embodiments, the air passageways 600 and the air passageway inlets 602 may be substantially evenly distributed around the longitudinal axis 208 of the nozzle 116 such that the air passageways 600 may be substantially diametrically opposed from one another.

As shown in FIG. 6, one or more of the air passageways 600 may include a cross-sectional area at the air passageway inlet 602 that may resemble a substantially curved and/or substantially ovular shape. As the air passageways 600 extend towards the interior cavity of the nozzle 116, in a direction toward the second end 120 of the nozzle 116, one or more of the air passageways 600 may taper (e.g., may decrease in diameter) to a respective air passageway outlet. Additionally, or alternatively, the air passageways 600 may be curved, chamfered, frustoconical, and/or any combination thereof.

The air passageways 600 may be configured to direct air, received via the air passageway inlets 602, towards the interior cavity of the nozzle 116, where air may mix with reductant supplied by the reductant channel 306. Additionally, because a cross-sectional area of the air passageways 600 reduces in size as the air passageways 600 advance towards the interior cavity 600, a velocity of air passing through the respective air passageways 600 may increase as the air approaches the second end 120 of the nozzle 116. Accordingly, when injected into the interior cavity, air may mix with reductant at an increased velocity to increase an atomization of the reductant. In some embodiments, each of the air passageways 600 may comprise a substantially similar size and shape compared to one another such that the air passageways 600 each receive a substantially equal amount of air from the air channel 304. In turn, by having a similar size and/or shape, air supplied by respective the air passageways 600 may substantially uniformly mix with reductant, potentially leading to a substantially uniform atomization within the interior cavity of the nozzle 116. Further, although FIG. 6 illustrates the example air channel 304 branching into four air passageways 600, the nozzle 116 may include more than or less than four air passageways 600. For instance, in some examples the nozzle 116 may include greater than or less than twelve air passageways 600.

Figure 7:
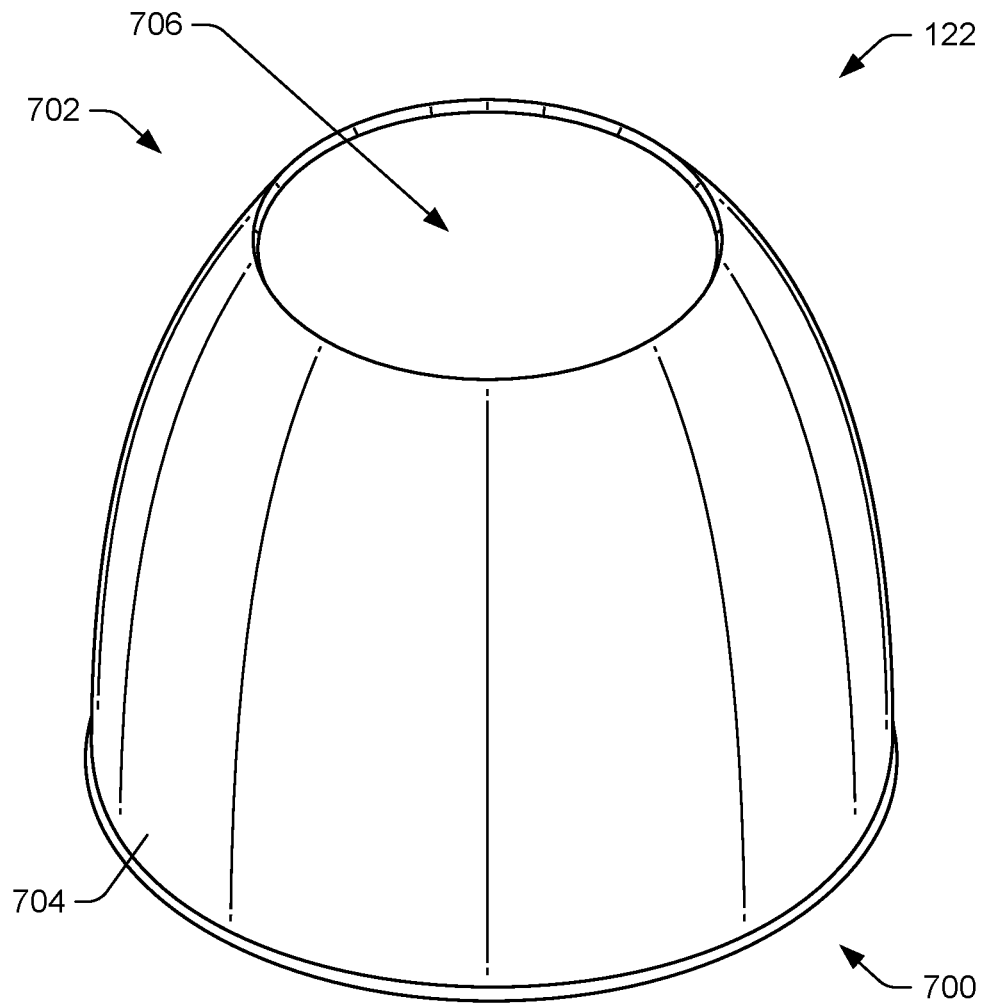
FIG. 7 is a top perspective view of the nozzle housing of FIG. 1 in accordance with an example embodiment of the present disclosure.

FIG. 7 illustrates a top perspective view of the nozzle housing 122. The nozzle housing 122 may include a first end 700 and a second end 702. Extending from the first end 700 to the second end 702 may be an exterior surface 704 of the nozzle housing 122. As shown, the exterior surface 704 may curve or taper from the first end 700 to the second end 702.

At the second end 702, the nozzle housing 122 may include an orifice 706. The orifice 706 may be substantially circular, substantially ovular, and/or any other shape, and the orifice 706 may be configured to receive the second end 120 of the nozzle 116. That is, returning briefly to FIG. 1, and as discussed in detail herein, the second end 120 of the nozzle 116 may extend through and/or beyond the orifice 706 such that the second end 120 of the nozzle 116 may be disposed external to the nozzle housing 122.

Figure 8:
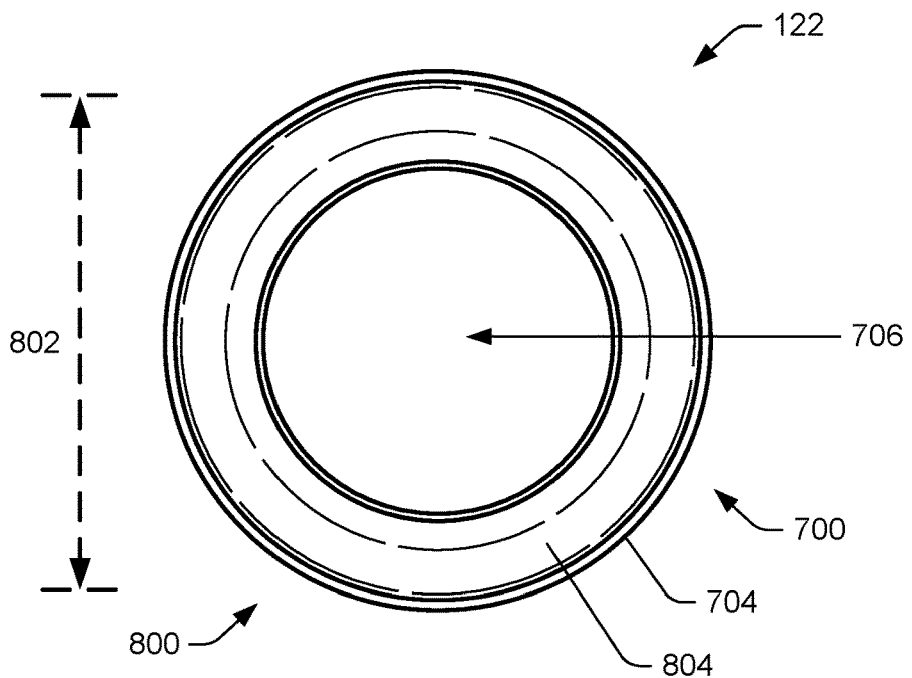
FIG. 8 is a bottom view of the nozzle housing of FIG. 1 in accordance with an example embodiment of the present disclosure.

FIG. 8 illustrates a bottom view of the nozzle housing 122 as seen from the first end 700. As shown, the nozzle housing 122 may taper from the first end 700 towards the second end 702, thereby reducing in cross-sectional dimension.

The first end 700 of the nozzle 116 may include an orifice 800 having a diameter 802. Additionally, the nozzle housing 122 may include an interior surface 804 disposed opposite the exterior surface 704. The nozzle housing 122 may include a thickness extending between the exterior surface 704 and the interior surface 804. The interior surface 804 extends between the first end 700 and the second end 702 of the nozzle housing 122, or between the orifice 706 and the orifice 800.

As will be discussed herein, in some embodiments, the nozzle 116 and the nozzle housing 122 may be coupled together. For instance, the nozzle housing 122 may be configured to reside over an outer periphery of the nozzle 116 formed by the radially outermost surface 206 of the vanes 202. As such, and shown in greater detail in FIG. 11, the diameter 802 of the orifice 800 may be substantially equal to the linear distance 510 to permit the nozzle housing 122 to fit over the nozzle 116 during assembly.

Figure 9:
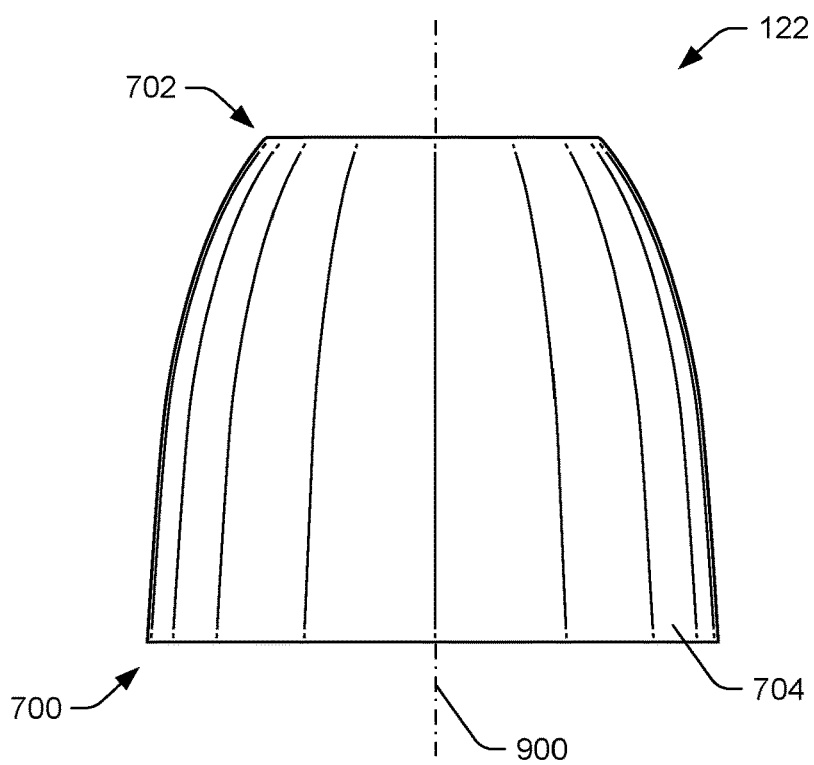
FIG. 9 is a side view of the nozzle housing of FIG. 1 in accordance with an example embodiment of the present disclosure.

FIG. 9 illustrates a side view of the nozzle housing 122. The nozzle housing 122 may be symmetrical about a longitudinal axis 900 of the nozzle housing 122, and in some examples, the longitudinal axis 900 of the nozzle housing 122 may be substantially co-linear with the longitudinal axis 208 of the nozzle 116 when the nozzle housing 122 is coupled to the nozzle 116. The nozzle housing 122 may include the exterior surface 704 that tapers from the first end 700 to the second end 702 and along the longitudinal axis 900.

Figure 10:
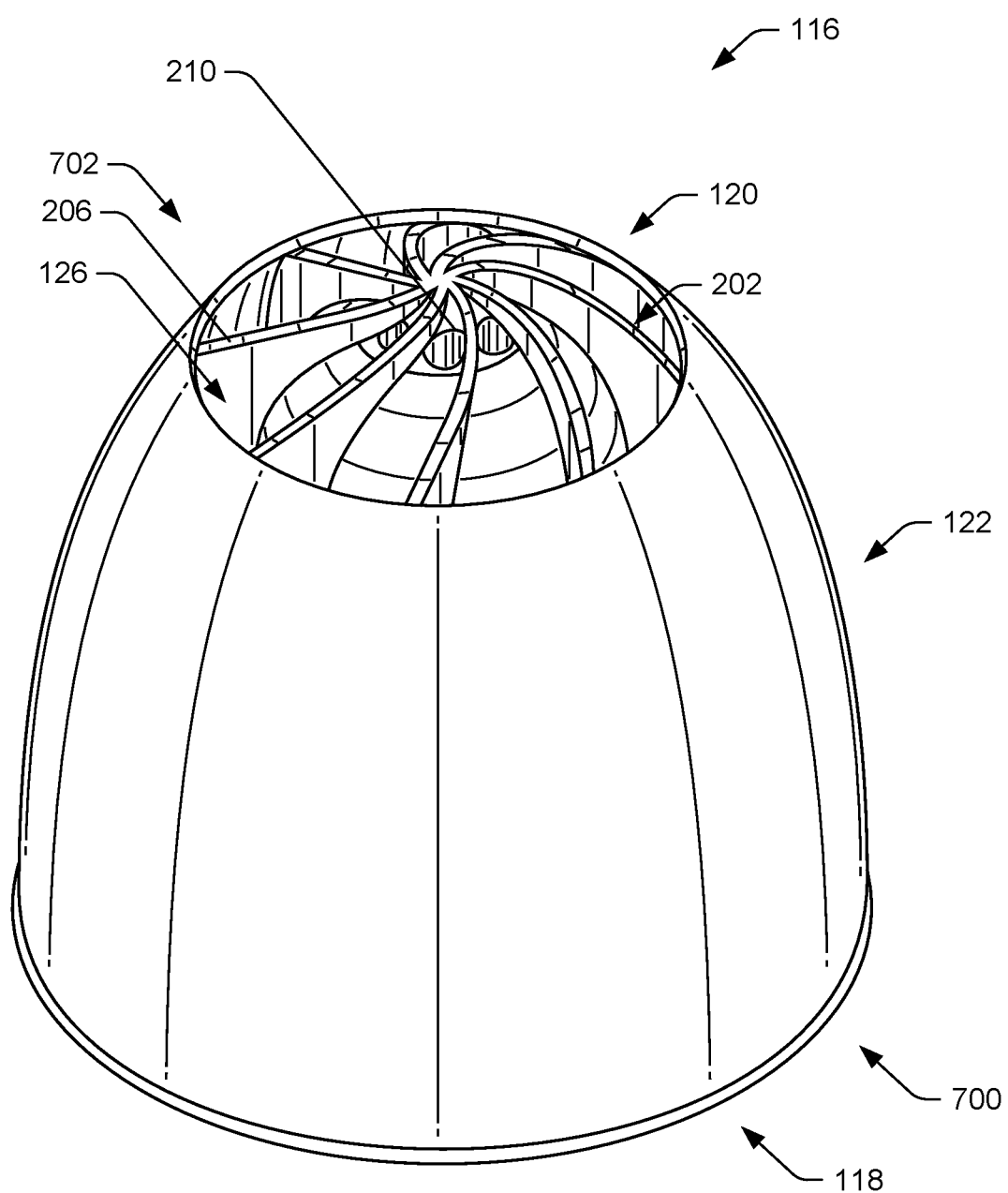
FIG. 10 is a perspective view of the nozzle and the nozzle housing of FIG. 1, showing the nozzle disposed within the nozzle housing in accordance with an example embodiment of the present disclosure.

FIG. 10 illustrates a perspective view of the nozzle 116, showing the nozzle housing 122 disposed over a portion of the nozzle 116. During manufacture, the first end 700 of the nozzle housing 122 may be advanced over the radially outermost surfaces 206 of the vanes 202, from the second end 120 towards the first end 118 of the nozzle 116. In turn, as the radially outermost surface 206 of the vanes 202 come into contact with the interior surface 804 of the nozzle housing 122, the first end 118 of the nozzle 116 may align with the first end 700 of the nozzle housing 122. Stated alternatively, during manufacture, the interior surface 804 of the nozzle housing 122 may descend over the respective radially outermost surface 206 of the respective vanes 202 as the first end 700 of the nozzle housing 122 advances towards the first end 118 of the nozzle 116.

Given the taper of the nozzle housing 122 from the first end 700 to the second end 702, the interior surface 804 of the nozzle housing 122 may come to rest on the radially outermost surface 206 of the vanes 202, thereby preventing the nozzle housing 122 advancing further towards the first end 118 of the nozzle 116. Additionally, because the second end 702 of the nozzle housing 122 includes the orifice 706, the second end 120 of the nozzle housing 122 may extend through the orifice 704, allowing reductant solution to exit the spray channel outlets 210 and into the exhaust 102. The nozzle 116 and the nozzle housing 122 may be secured to one another using adhesives, fasteners, weldments, etc. In some embodiments, the nozzle housing 122 may be removably attachable to permanently attachable to the nozzle 116. Additionally, in some instances, the nozzle 116 and the nozzle housing 122 may be manufactured as a single component. In embodiments where the nozzle housing 122 is coupled to the nozzle 116, the nozzle housing 122 may assist in routing the exhaust 102 within the channels 126 towards the second end 120 of the nozzle 116. In particular, in such examples the interior surface 804 of the nozzle housing 122 may form at least a portion of one or more of the respective channels 126 to assist in directing exhaust 102 from the first end 118 of the nozzle 116 toward the second end 120 of the nozzle 116.

Figure 11:
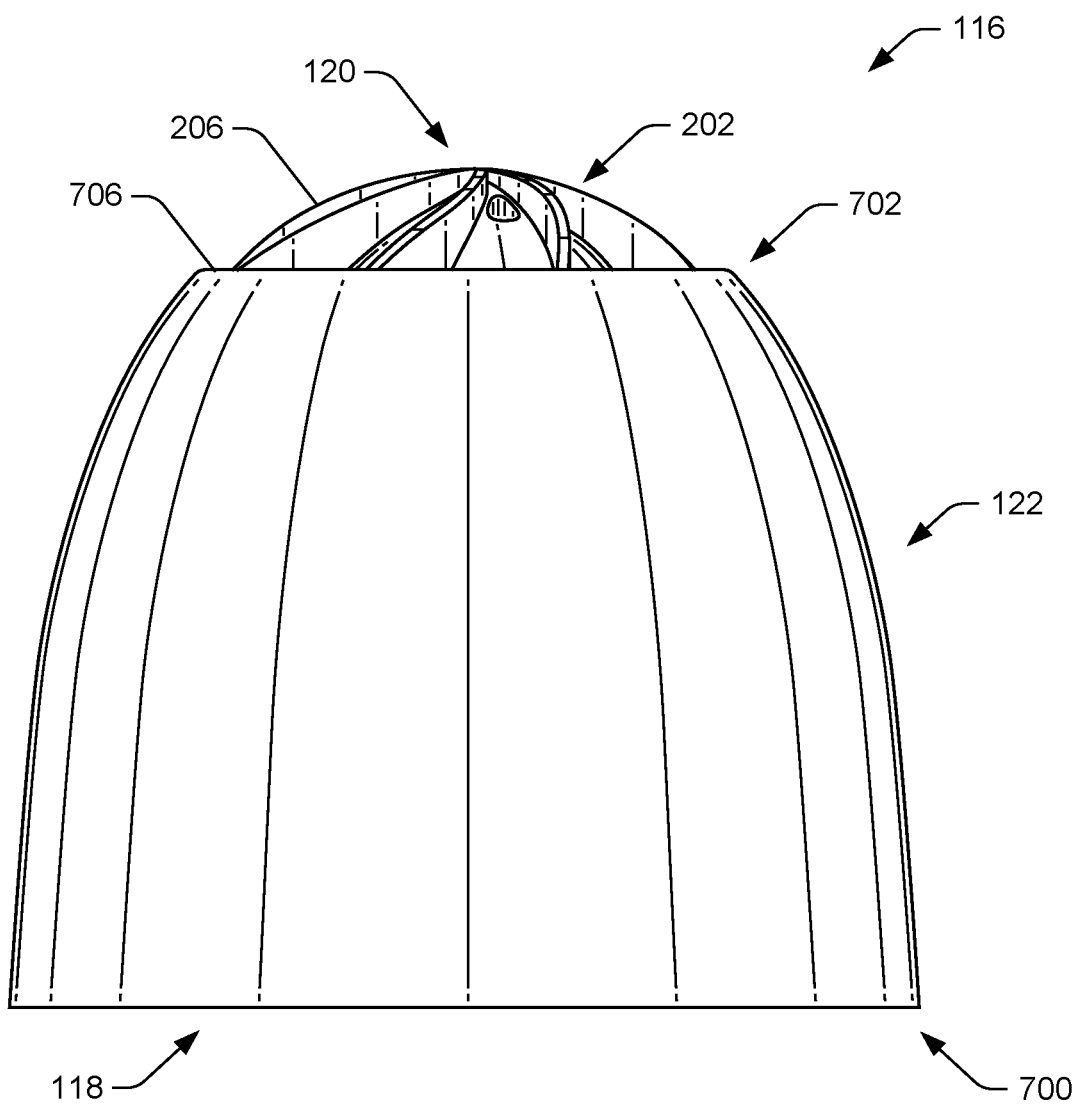
FIG. 11 is a side view of the nozzle and the nozzle housing of FIG. 1, showing the nozzle disposed within the nozzle housing in accordance with an example embodiment of the present disclosure.

FIG. 11 illustrates a side view of the nozzle 116, showing the nozzle housing 122 disposed over a portion of the nozzle 116. As shown, the second end 120 of the nozzle 116 may protrude or extend through the orifice 706 at the second end 702 of the nozzle housing 122. As noted above, the nozzle housing 122 may slide over the radially outermost surface 206 of the vanes 202 until the first end 700 of the nozzle housing 122 may no longer advance towards the first end 118 of the nozzle 116. Therefore, the interior surface 804 of the nozzle housing 122 may come to rest on the radially outermost surface 206 of the vanes 202. As such, along the interior surface 804, the radially outermost surface 206 of the respective vanes may adjoin to the nozzle housing 122. In doing so, a curvature of the vanes 202 and a curvature of the interior surface 804 may be substantially similar such that the radially outermost surface 206 of the vanes 202 may abut the interior surface 804 of the nozzle housing 122 along a length (e.g., along substantially an entire length of) of the vanes 202. In some embodiments, the first end 700 of the nozzle housing 122 and the first end 118 of the nozzle 116 may be co-planar.

Figure 12:
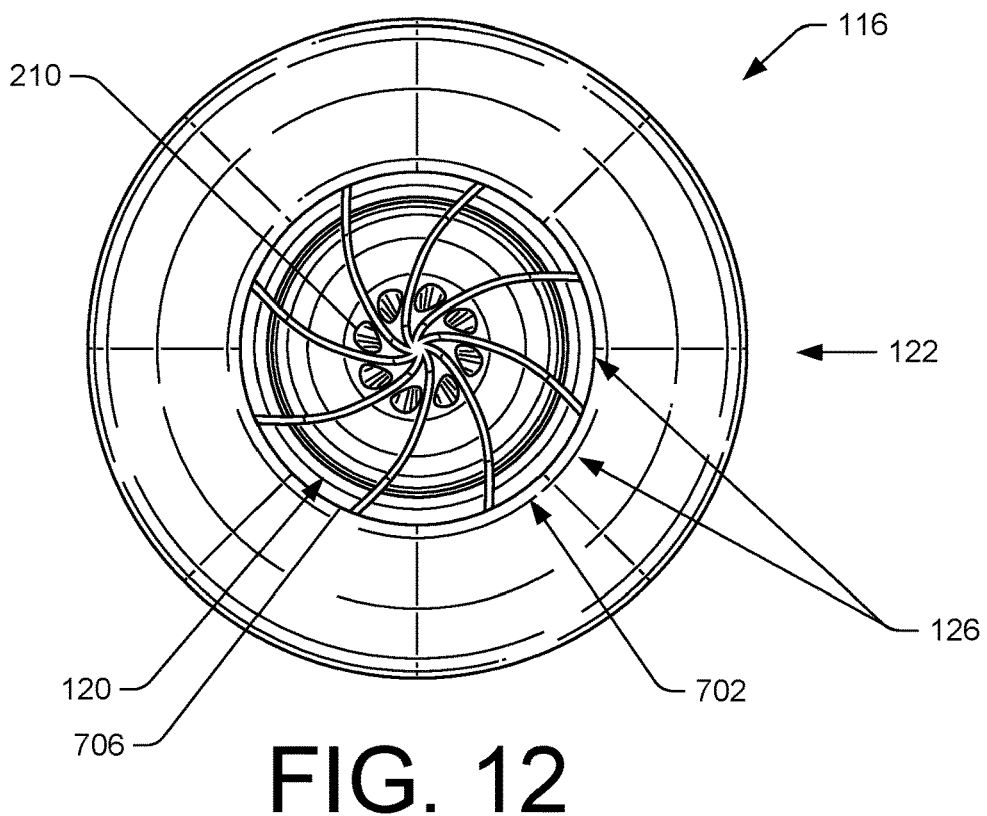
FIG. 12 is a top view of the nozzle and the nozzle housing of FIG. 1, showing the nozzle disposed within the nozzle housing in accordance with an example embodiment of the present disclosure.

FIG. 12 illustrates a top view of the nozzle 116, showing the second end 120 of the nozzle 116 extending through the orifice 706 at the second end 702 of the nozzle housing 122. Additionally, the orifice 706 may be configured to direct the exhaust 102 flowing through the channels 126 to exit the channels 126 and pass over the spray channel outlets 210. That is, individual channels 126 may include a corresponding outlet adjacent to the second end 702 of the nozzle housing 122, whereby the exhaust 102 may exit the channels 126 in a swirling nature about the longitudinal axis 208 of the nozzle 116. The exhaust 102 may pass over a corresponding spray channel outlet 210.

Figure 13:
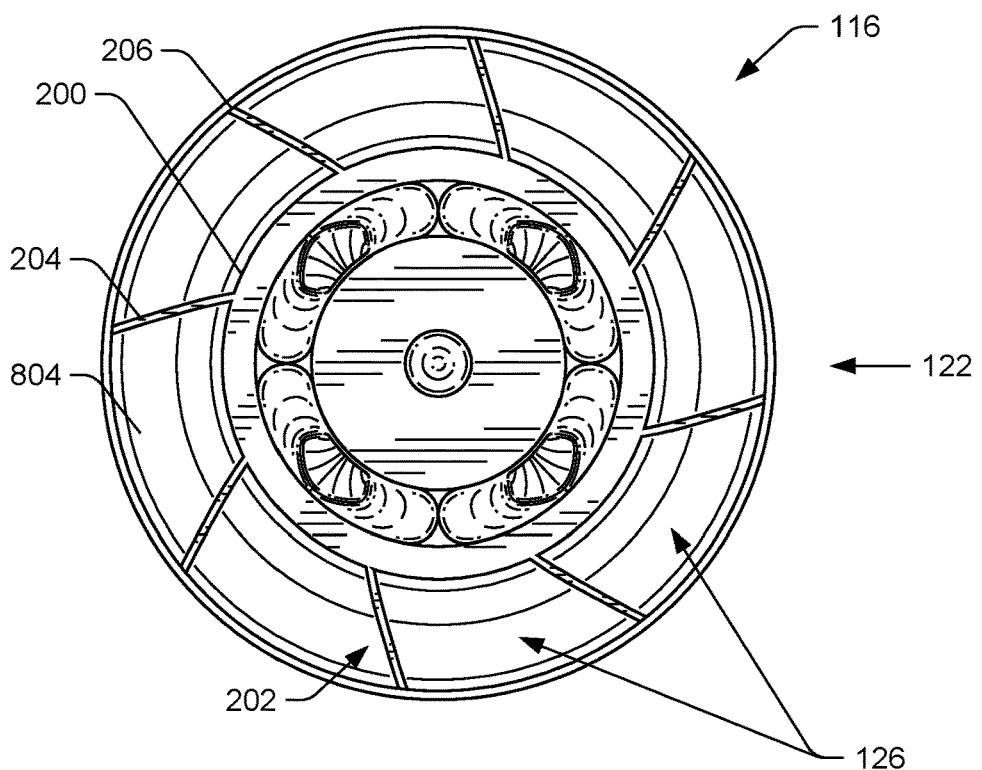
FIG. 13 is a bottom view of the nozzle and the nozzle housing of FIG. 1, showing the nozzle disposed within the nozzle housing in accordance with an example embodiment of the present disclosure.

FIG. 13 illustrates a bottom view of the nozzle 116, showing the vanes 202 interfacing the nozzle housing 122. More particularly, FIG. 13 illustrates that the radially outermost surface 206 of the vanes 202 may align substantially flush with the interior surface 804 of the nozzle housing 122. In doing so, the exhaust 102 may be routed from the first end 118 to the second end 120 of the nozzle 116 via the channels 126. In this configuration, each respective channel 126 may be substantially fluidly separate from the remaining channels 126 formed by the nozzle 116.

In embodiments where the nozzle 116 and the nozzle housing 122 are coupled together, individual channels 126 may be enclosed on multiple sides: the exterior surface 200 on one side (e.g., first lateral side); the interior surface 804 of the nozzle housing 122 on one side (e.g., second lateral side); and the sidewalls 204 of adjacent vanes 202 on two sides (e.g., a first sidewall 204 of a first vane 202 and a second sidewall 204 of a second vane 202 opposite the first sidewall 204 of the first vane 202). In doing so, individual channels 126 may be substantially fluidly separate from one another. Additionally, FIG. 13 illustrates that individual channels 126 may include a corresponding inlet adjacent to the first end 118 of the nozzle 116 and the first end 700 of the nozzle housing 122, whereby the exhaust 102 may enter the channels 126.

As noted above, the vanes 202 may be helical about the longitudinal axis 208 from the first end 118 to the second end 120 to induce a swirling motion into the exhaust 102 passing through the channels 126. The helical nature of the channels 126 may assist in reducing a crystallization of the reductant solution at the spray channel outlets 210 by drawing reductant solution out of the spray channel outlets 210. Additionally, by virtue of the channels 126 tapering, the exhaust 102 within the channels 126 may increase in velocity to remove reductant.

Figure 14:
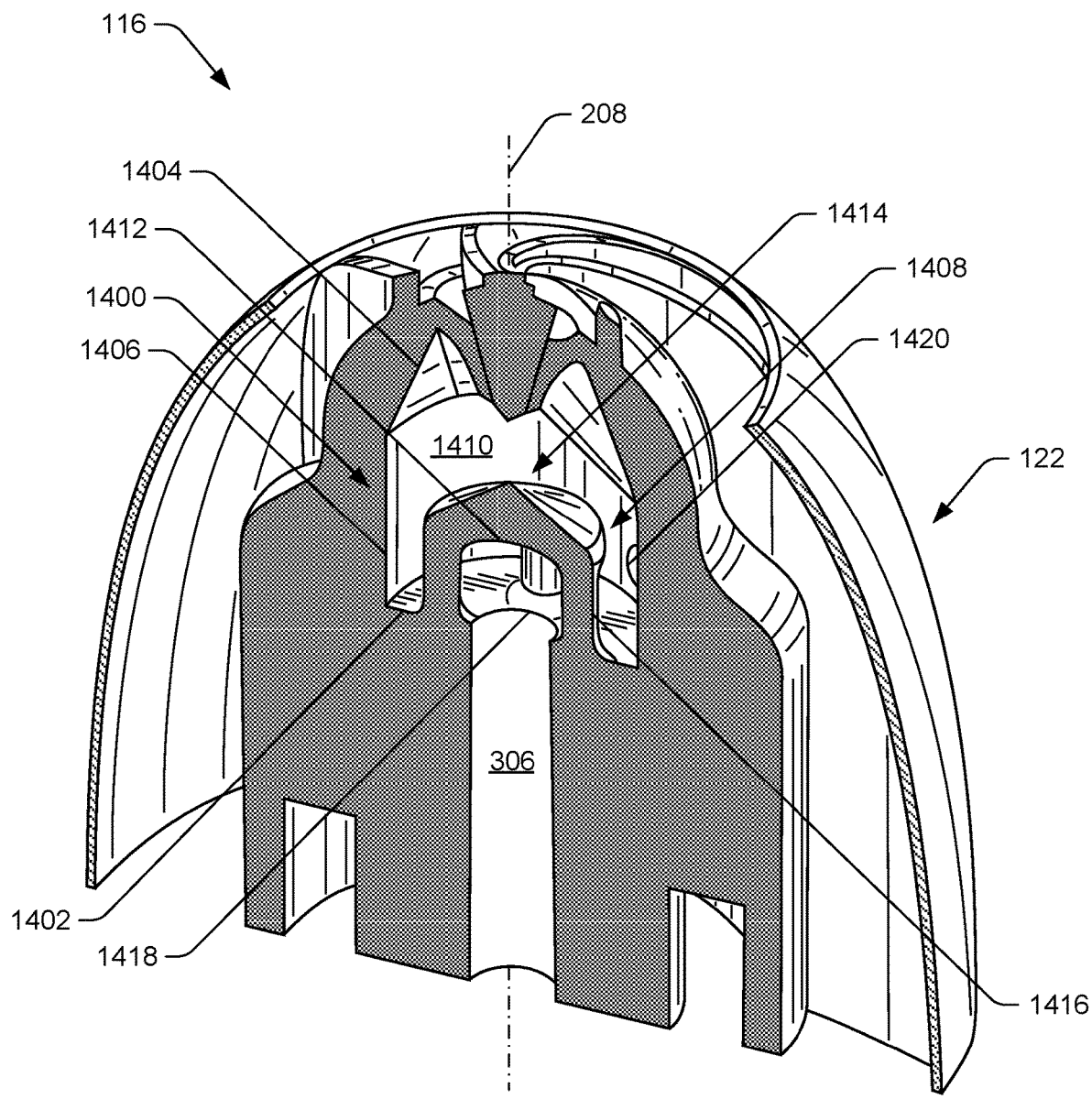
FIG. 14 is a cross-sectional view of the nozzle of FIG. 1 in accordance with an example embodiment of the present disclosure.

FIG. 14 illustrates a cross-sectional view of the nozzle 116 and the nozzle housing 122 coupled together. As shown in FIG. 14, the nozzle 116 may define an interior cavity 1400 disposed interior to the exterior surface 200 of the nozzle 116. As shown, the interior cavity 1400 may be disposed between the first end 118 and the second end 120 of the nozzle 116, but in some instances, may be disposed closer to the second end 120 than the first end 118 of the nozzle 116.

The interior cavity 1400 may be formed by the nozzle 116, and may be defined by a bottom end 1402, a top end 1404 opposite the top end 1402, and a sidewall 1406 formed by the nozzle 116. In such examples, the sidewall 1406 may extend from the bottom end 1402 to the top end 1404 of the interior cavity 1400. In some examples, the interior cavity 1400 may also include a structure 1408 and a chamber 1410. For instance, the structure 1408 may be substantially centrally located within the interior cavity 1400, and the structure 1408 may be substantially centrally aligned with the longitudinal axis 208 of the nozzle 116. In some instances, the structure 1408 may extend from the bottom end 1402 of the interior cavity 1400 towards the top end 1404 of the interior cavity 1400. However, in some embodiments, the structure 1408 may extend from the top end 1404 or the sidewall 1406 of the interior cavity 1400.

As shown in FIG. 14, in some examples the structure 1408 may include a first side having impinging surface 1412 and a second side opposite the first side having a substantially conical top 1414. In some examples, the impinging surface 1412 may be substantially concave and may include a substantially conical surface, a substantially semi-spherical surface, and/or a combination thereof. In some examples, the impinging surface 1412 may be oriented at an acute included angle equal to approximately 15 degrees, approximately 30 degrees, approximately 45 degrees, and/or any other value relative to an axis or plane extending perpendicular to the longitudinal axis 208 of the nozzle 116.

The structure 1408 further may also include one or more columns, posts, or legs 1416 extending from the first side of the structure 1408, adjacent to the impinging surface 1412. The legs 1416 may offset or support the impinging surface 1412 of the structure 1408 above or opposite the reductant channel 306. For example, the legs 1416 may couple the structure 1408 to the bottom end 1402, the top end 1404, and/or the sidewalls 1406 to support the impinging surface 1412 from the bottom end 1402 of the interior cavity 1400 or away from a reductant channel outlet 1418 at any desired distance. In some embodiments, the structure 1408 may include four legs 1416 that may be substantially equally spaced around the reductant channel 306 (i.e., spaced approximately 90 degrees apart). However, in some embodiments, the structure 1408 may include more than or less than four legs 1416. For example, the structure 1408 may include three legs 1416. Additionally, gaps or spaces may be disposed between adjacent legs 1416.

In some example embodiments, a centerline of the reductant channel 306 may align with a center point (or centerline) of the impinging surface 1412 of the structure 1408. In such examples, the longitudinal axis 208 of the nozzle 116 may pass substantially centrally through the impinging surface 1412 and through the reductant channel 306. Additionally, in some embodiments, the impinging surface 1412 may include a similar width as the reductant channel 306. However, in some embodiments, the width of the impinging surface 1412 may be larger than the width of the reductant channel 306 to account for an expansion of the reductant exiting the reductant outlet 1418.

As discussed above, the nozzle 116 may include the passageways 600 (FIG. 6) that terminate in outlets, and the respective outlets of each air passageway 600 may be configured to direct air form the air passageways 600 into the interior cavity 1400. For example, each of the air passageways 600 may include a respective air passageway inlet 602 (FIG. 6) and a corresponding air passageway outlet 1420 that disperses air into the interior cavity 1400. In some embodiments, the air passageways 600 may terminate at the sidewall 1406 of the interior cavity 1400, and in such examples, the sidewall 1406 may form the air passageway outlets 1420 that discharge air into the interior cavity 1400.

In some embodiments, an orientation of the one or more air passageway outlets 1420 may be substantially perpendicular to the reductant channel 306 and/or the reductant channel outlet 1418. In other words, the reductant may enter the interior cavity 1400 axially and/or in a direction extending substantially perpendicular to the longitudinal axis 208 of the nozzle 116, while the air may enter the interior cavity 1400 radially and/or in a direction extending substantially perpendicular to the longitudinal axis 208 of the nozzle 116. Additionally, the air passageway outlets 1420 may be substantially equally spaced around a perimeter of the interior cavity 1400.

The top end 1404 of the interior cavity 1400 may converge (e.g., having a smaller diameter than the bottom end 1402) to guide and accelerate the reductant solution to the spray channel outlets 210. That is, the top end 1404 may converge towards the longitudinal axis 208 of the nozzle 116. Discussed in detail herein, channels may funnel the reductant solution from the chamber 1410 to the spray channel outlets 210.

As discussed above, the legs 1416 may support the impinging surface 1412 from the bottom end 1402 of the interior cavity 1400 to allow the reductant to disperse from underneath the structure 1408. Further, in instances where the structure 1408 includes more than one leg 1416, a gap may separate the adjacent legs 1416. In some embodiments, the air passageway outlets 1420 may be configured and oriented to disperse air towards the gap disposed between adjacent legs 1416. In some embodiments, each air passageway outlet 1420 may be disposed opposite to a respective gap between the legs 1416 and/or oriented towards the gap. As such, the air passageway outlets 1420 may be positioned and/or oriented to inject air into the interior cavity 1400 at a location where the reductant exits from underneath the structure 1408. In other words, the gaps interposed between adjacent legs 1416 permit the reductant to radially disperse towards the sidewall 1406.

A shape of the legs 1416 and/or a location of the legs 1416 within the interior cavity 1400 may minimize an interference with the reductant as it passes from the reductant channel 306 toward the sidewall 1406.

Additionally, the nozzle 116 may include more than four air passageways 600 and associated air passageway outlets 1420. Increasing the number of air passageways 600 may increase the amount of air injected into the interior cavity 1400, which may and lead to an increased atomization of the reductant. The number of the air passageways 600 may depend on an operational environment of the nozzle 116. For example, in applications where the flow rate or volume of exhaust 102 may be high, including more air passageways 600 may increase the atomization of the reductant and/or compensate for an increased flow rate of reductant.

Figure 15:
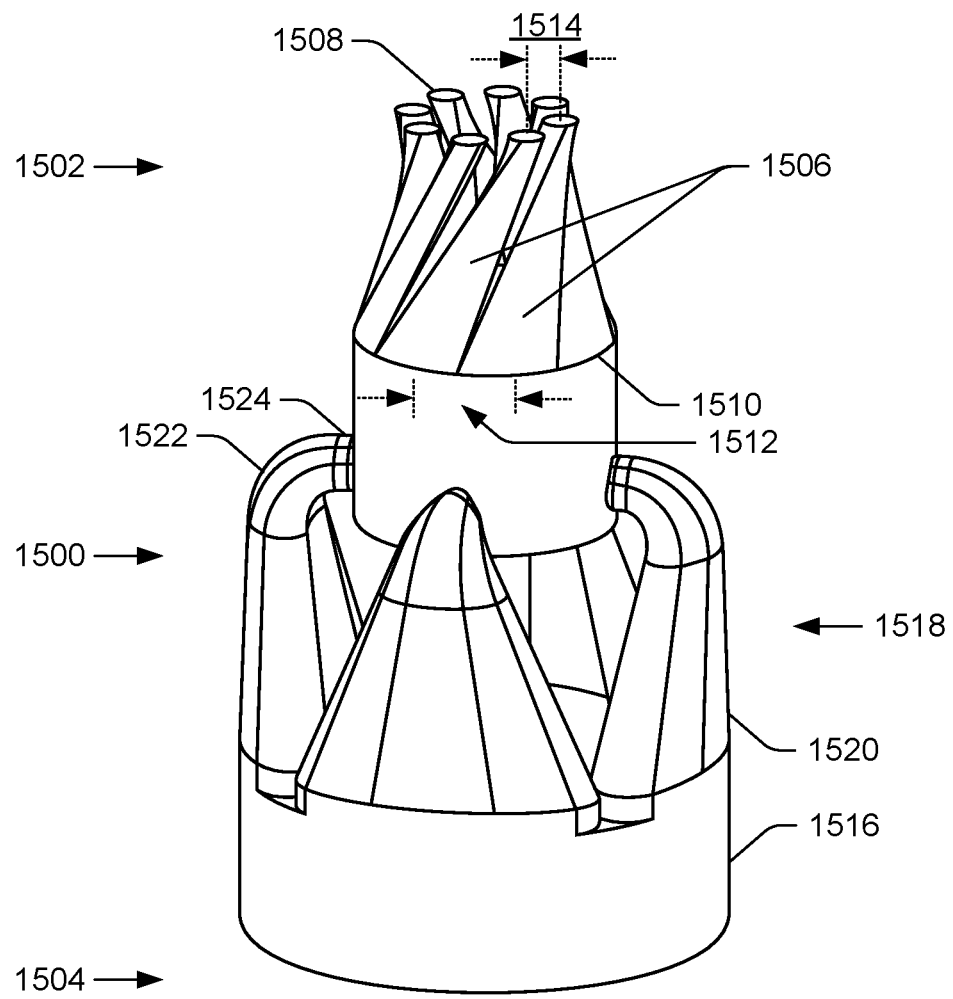
FIG. 15 is a perspective view of a negative space within the nozzle of FIG. 1 in accordance with an example embodiment of the present disclosure.

FIG. 15 illustrates a perspective view of a negative space 1500 of the nozzle 116. The negative space 1500 may represent a void, or void space, associated with forming the nozzle 116 of the present disclosure in a 3D printing process or other manufacturing process. For example, the various components of the negative space 1500 illustrated in FIG. 15 may be representative of the air passageways 600, the interior cavity 1400, and/or other flow channels/passageways of the nozzle 116 formed in an example 3D printing process.

The negative space 1500 may be defined by a top 1502, which may correspond to the second end 120 of the nozzle 116, and a bottom 1504, which may correspond to the first end 118 of the nozzle 116. Further, the negative space 1500 may include a spray channel void space 1506 corresponding to channels of the nozzle 116 that fluidly connect to the spray channel outlets 210. The spray channel void space 1506 may include a spray channel outlet void space 1508, which may correspond to the spray channel outlets 210, and a spray channel inlet void space 1510, which may correspond to spray channel inlets of the spray channels that feed the spray channel outlets 210. In some example embodiments, the spray channel void space 1506 may be helical about the longitudinal axis 208 of the nozzle 116. With such a configuration, as the spray channels extend from the spray nozzle inlets towards the spray channel outlets 210, the spray channels may be helical about the longitudinal axis 208 of the nozzle 116. In some embodiments, because the spray channels may be helical towards the second end 120 of the nozzle 116 and along the longitudinal axis 208, FIG. 15 illustrates that the spray channel void space 1506 may converge towards the top 1502 of the void space 1500. Stated alternatively, at the top 1502 of the void space 1500, a distance 1512 extending from a center point of a first spray channel inlet void space 1510 to a center point of a second spray channel inlet void space 1510 adjacent to the first spray channel inlet void space 1510 may be greater than a distance 1514 extending from a center point of the first spray channel outlet void space 1508 to a center point of the second spray channel outlet void space 1508 adjacent to the first spray channel outlet void space 1508. As such, respective spray channel outlets 210 may not be concentric or aligned with a respective spray channel inlet.

The spray channel void space 1506 may also taper along a length of the spray channel void space 1506, between the spray channel inlet void space 1510 and the spray channel outlet void space 1508. For instance, the spray channel void space 1506 may include a first cross-sectional area at the spray channel inlet void space 1510 and a second cross-sectional area at the spray channel outlet void space 1508 that may be less than the first-cross sectional area. Additionally, a cross-sectional shape of the spray channel inlet void space 1510 may be different than a cross-sectional shape of the spray channel outlet void space 1508. For instance, the spray channel inlet void space 1510 may include a trapezoidal shape while the spray channel outlet void space 1512 may include a substantially circular shape.

The spray channel void space 1506 forms spray channels having a helical nature, which may assist in imparting a fluid twist to the reductant solution and may further mix the reductant solution within the exhaust pipe 106. In an embodiment, the swirling effect of the reductant solution may create a plume of reductant solution large enough to extend to an outer periphery of the exhaust pipe 106, for instance, and may assist in conically spraying the reductant solution into the exhaust 104. In some embodiments, the angle at which the spray channel outlets 210 are oriented from the longitudinal axis 208 of the nozzle 116 may adjust a plume size or swirling motion of the reductant solution. For instance, depending on the application of the nozzle 116, the spray channel void space 1506 and/or the spray channel outlet void space 1508 may be adjusted to create a narrow plume or a wide plume. Additionally, the reduction in cross-sectional area of the spray channel may impart velocity into the reductant solution as the reductant solution passes from the spray channel inlets to the spray channel outlets 210. The increased velocity may enhance mixing, atomization, and dispersion of the reductant solution.

Located at the bottom 1504 of the negative space 1500 may be the air channel void space 1516, which may correspond to the air channel 304. As discussed above, in some examples the air channel 304 may branch into the air passageways 600, including four air passageways 600 that direct the air into the interior cavity 1400. Accordingly, the negative space 1500 may include air passageway void space 1518. For example, the air passageways void space 1518 may include a first portion 1520, a second portion 1522, and a third portion 1524.

Each of the air passageway void space 1518 may branch from the air channel void space 1516 to receive air. As the air passageway void space 1518 advance from the first portion 1520 towards the second portion 1522, the air passageway void space 1518 may taper inward and reduce in cross-sectional area. As shown in FIG. 15, the air passageway void space 1518, and particularly the first portion 1520, may taper in multiple directions. As the air passageway void space 1518 approaches the interior cavity 1400 of the nozzle 116, the air passageway void space 1518 may curve at the second void space 1522. Therein, the third portion 1524 of the air passageway void space 1518 may extend inwardly and towards the interior cavity 1400.

In other words, the reductant channel void space 1518 may form the air channel 304 that is substantially parallel with the longitudinal axis 208 of the nozzle 116. Therein, the air may pass from the air channel 304 to the air passageways 600. The first portion 1520 may be substantially parallel to the longitudinal axis 208 and taper as the first portion 1520 advances towards the second portion 1522 of the air passageway void space 1518. The second portion 1522 of air passageway void space 1518 may curve towards the longitudinal axis 208 of the nozzle 116. The third portion 1524 of the air passageway void space 1518 may be substantially perpendicular to the longitudinal axis 208. Accordingly, due to the configurations of the air channel void space 1516 and the air passageway void space 1518, in some example embodiments, the air passageways 600 and/or the air passageway outlets 1420 may be configured to direct air into the interior cavity 1400 in a direction substantially perpendicular to the longitudinal axis 208 and/or substantially perpendicular to the flow direction of injected reductant entering the interior cavity 1400 from the reductant channel 306 (as shown in FIG. 14). In such examples, the reductant channel outlet 1418 and the air passageway outlets 1420 may be substantially perpendicular to one another.

Figure 16:
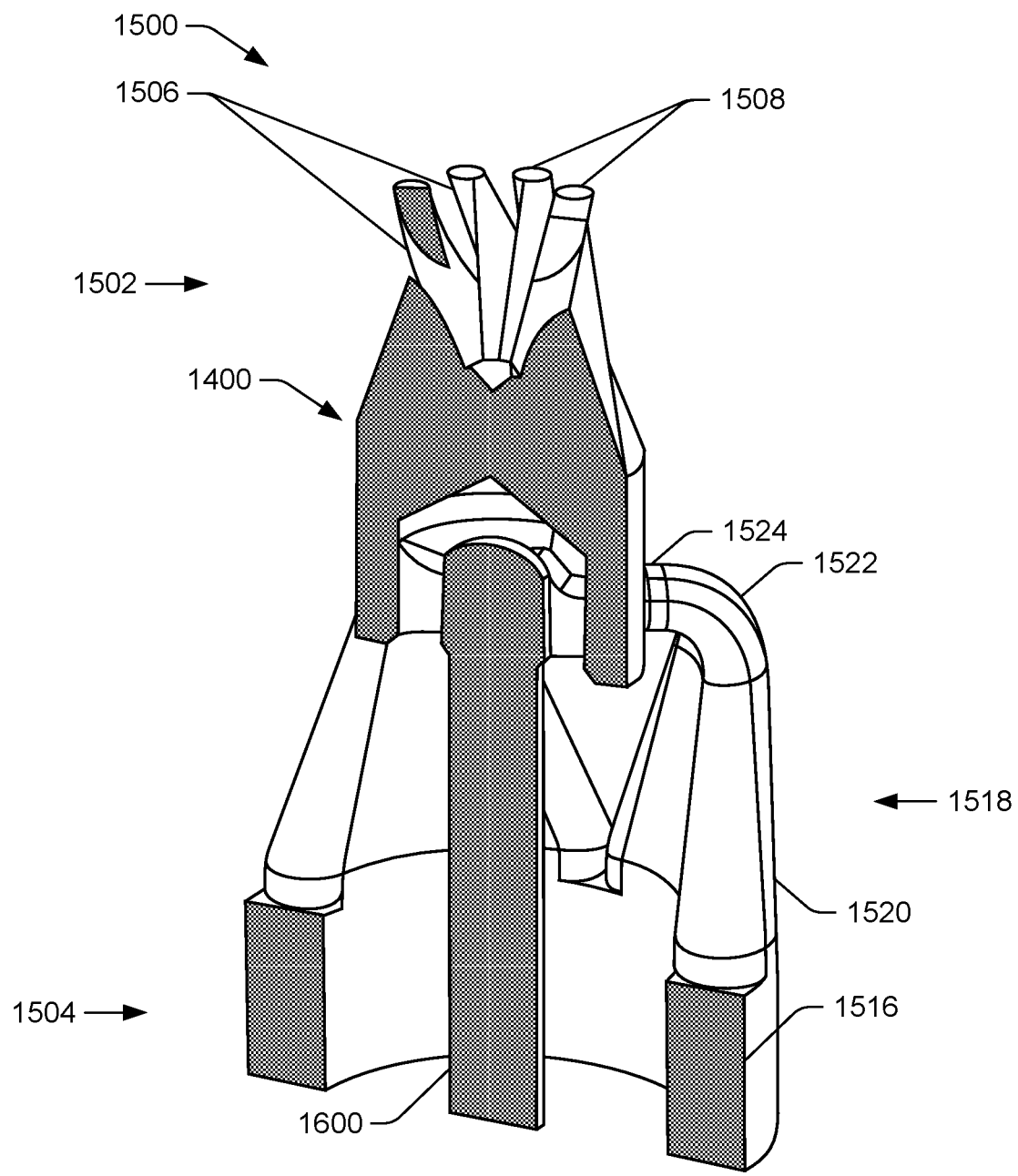
FIG. 16 is a cross-sectional view of the negative space of FIG. 15 in accordance with an example embodiment of the present disclosure.

FIG. 16 illustrates a cross-sectional view of the negative space 1500 of the nozzle 116. As shown in FIG. 16, the air channel void space 1516 may be configured as a substantially cylindrical orifice or annular ring. In some examples, the air channel void space 1516 may extend into the air passageway void space 1518, and particularly the first portion 1520 of the air passageway void space 1018. FIG. 16 also illustrates that the air passageway void space 1518 may be oriented in a similar direction as a reductant channel void space 1600, which may correspond to the reductant channel 306, and may be substantially parallel to the longitudinal axis 208 of the nozzle 116. The air passageway void space 1518 may curve at or along the second portion 1522 and orient inward toward the interior cavity 1400 at the third portion 1524. The third portion 1524 of the air passageway void space 1518 may extend substantially perpendicular to the longitudinal axis 208 of the nozzle 116, and may be oriented towards the interior cavity 700 of the nozzle 116. In an embodiment, the second portion 1522 may be substantially perpendicular to the first portion 1520 (i.e., may bend 90 degrees) such that dispersed air from each of the air passageways 600 may be oriented substantially perpendicular to the dispersed reductant exiting from the reductant channel 306. As shown at the top 1502 of the negative space 1500, the spray channel void space 1506 may follow a trajectory that may be helical about the longitudinal axis 208 of the nozzle 116. In an embodiment, the spray channels may angle or orient away from the longitudinal axis 208 of the nozzle 116.

Figure 17:
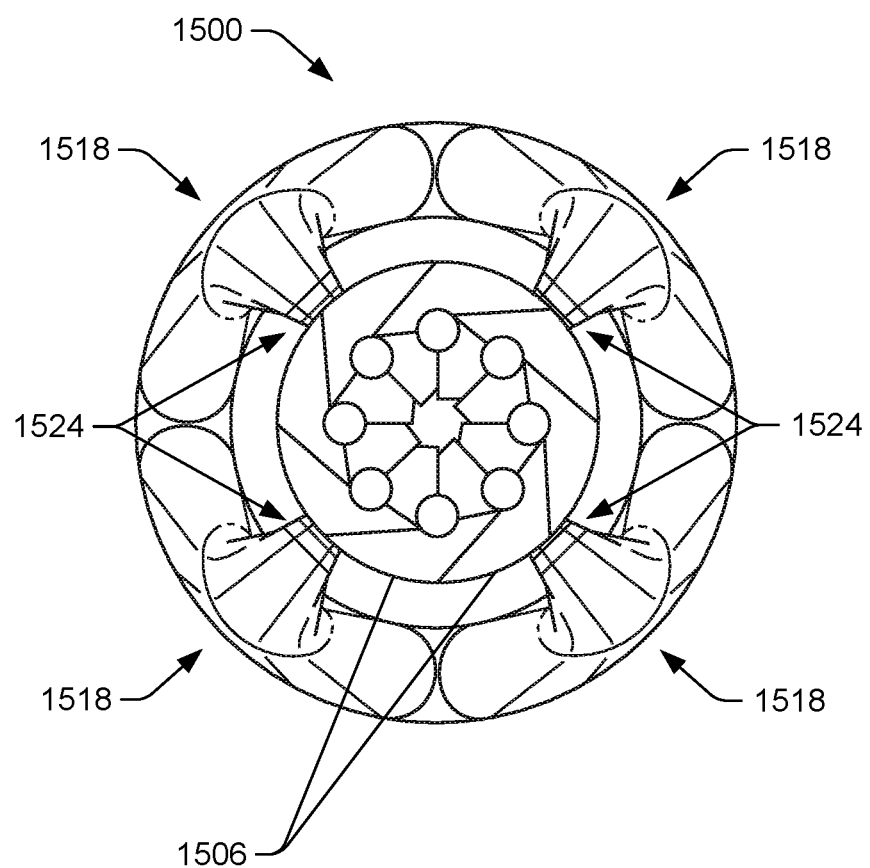
FIG. 17 is a top view of the negative space of FIG. 15 in accordance with an example embodiment of the present disclosure.

FIG. 17 illustrates a top view of the negative space 1500 of the nozzle 116. In FIG. 17, each of the air passageway void space 1518 is shown oriented towards the longitudinal axis 208 of the nozzle 116 to disperse air within the interior cavity 1400 at different directions. More particularly, the third portion 1524 of respective air passageway void spaces 1518 may be substantially diametrically opposed from one another such that air directed by the respective air passageways 600 radially mixes with the reductant at different directions. Additionally, each of the air passageway void space 1518 may be substantially similar in size to substantially uniformly disperse the air within the interior cavity 1400.

As also illustrated in FIG. 17, the spray channel void space 1506 may be helical about the longitudinal axis 208 of the nozzle 116 or a longitudinal axis of the void space 1500 (not shown) from the spray channel inlet void space 1510 to the spray channel outlet void space 1508. Each spray channel may include a corresponding spray channel void space 1506 having a respective central longitudinal axis (not shown) extending from the spray channel inlet void space 1510 to the spray channel outlet void space 1508. Additionally, the diameter, circumference, or cross-section of the spray channel void space 1506, as measured in plane perpendicular to the longitudinal axis of the spray channel void space 1506, may decrease from the spray channel inlet void space 1510 to the spray channel outlet void space 1508.

Figure 18:
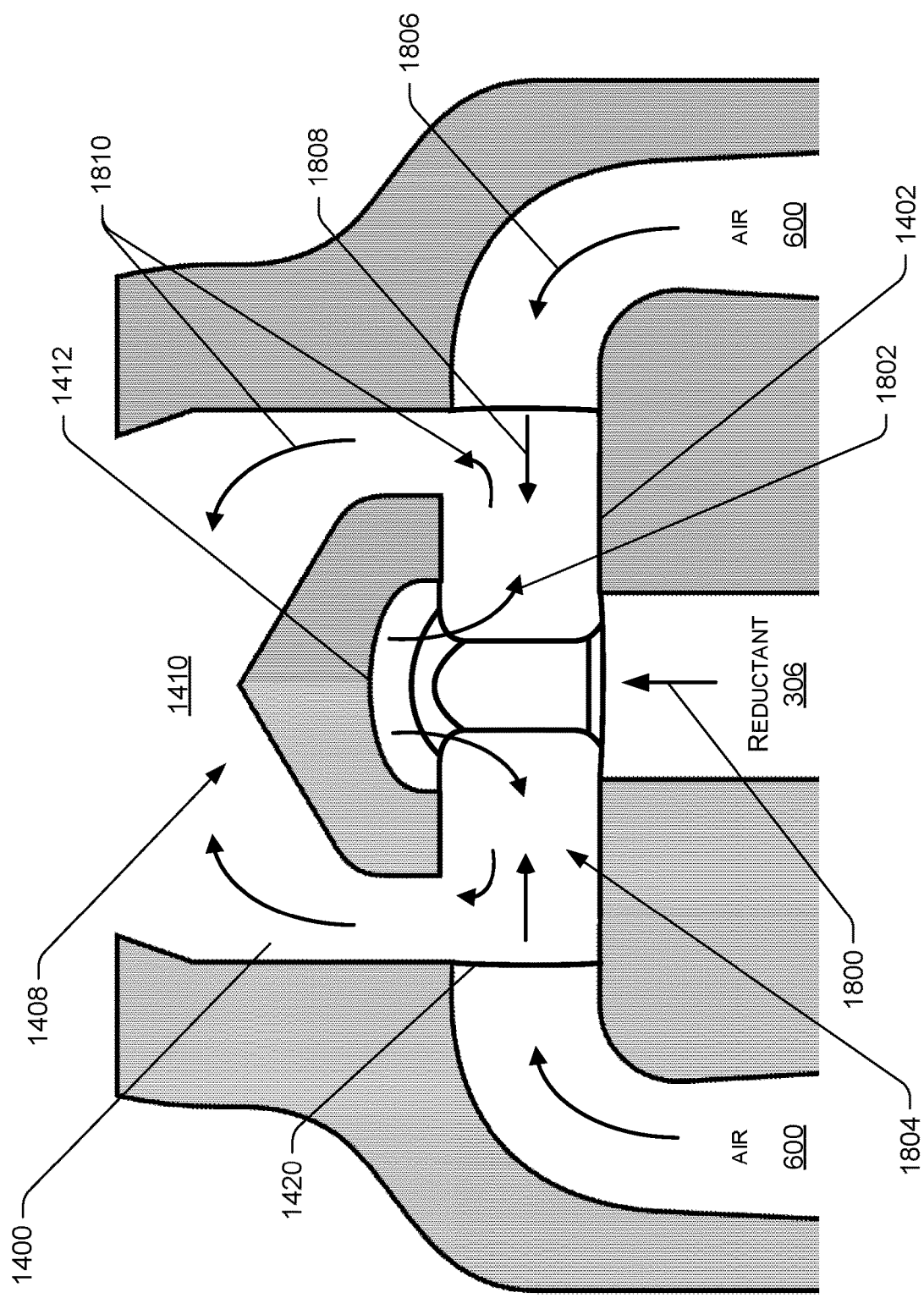
FIG. 18 is a cross-sectional view of an interior cavity of the nozzle of FIG. 1, showing directional flows of air and reductant in accordance with an example embodiment of the present disclosure.

FIG. 18 illustrates a cross-sectional view of the nozzle 116, showing a flow pattern of the reductant and air within the interior cavity 1400. The cross-sectional view in FIG. 18 is shown through two of the air passageways 600. As illustrated in FIG. 18, the reductant channel 306 may direct reductant, as shown by arrow 1800, into the interior cavity 1400, where the reductant may impact the impinging surface 1412 of the structure 1408. The concave nature of the impinging surface 1412 may assist in increasing the rate of atomization of the reductant. That is, through contacting, impinging, or otherwise impacting the concave impinging surface 1412, the reductant may break-up into relatively small particles. As a result of contacting the impinging surface 1412 of the structure 1408, the reductant may radially disperse away from the longitudinal axis 208 of the nozzle 116, towards sidewall 1406 of the interior cavity 1400, and/or towards the air passageway outlets 1420, as shown by arrow 1802. Noted above, and as shown in FIG. 18, impacting the impinging surface 1412 radially disperses the reductant from beneath the structure 1408 via a gap 1804 interposed between adjacent legs 1416.

The air passageways 600 may be disposed around the reductant channel 306 and may direct the air towards the interior cavity 1400 (or longitudinal axis 208), as shown by arrow 1806, and air passing through the air passageways 600 may exit the air passageways 600 via the air passageway outlets 1420 into the interior cavity 1400, as shown by arrow 1808. Further, the concave geometry of the impinging surface 1412 may substantially uniformly disperse the reductant into the interior cavity 1400 as the reductant impinges the impinging surface 1412. This substantially uniform dispersion may allow for the air to evenly mix with the reductant. As the air passageway outlets 1420 may be radially dispersed about the interior cavity 1400, the air may mix with the reductant from multiple directions. Accordingly, at a first instance, the reductant may impinge the impinging surface 1412 and radially disperse outward towards the sidewall 1406 of the interior cavity 1400, and at a second instance, the air discharged from the air passageways 600 may mix with the reductant.

The radial injection of the air, and the mixing of the air with the reductant, may direct or funnel the reductant solution towards the top end 1404 of the interior cavity 1400 and/or the chamber 1410. Within the chamber 1410, the air and reductant may mix to form the reductant solution. Additionally, the nature of the conical top of the structure 708 may provide a desired swirling flow pattern or effect within the chamber 1410. The swirling may further assist in mixing the reductant solution and/or further atomizing the reductant. Additionally, the chamber 1410 may permit the reductant solution to expand and potentially reduce a crystallization of the reductant solution. This expansion may minimize or eliminate clogging of the spray channel outlets 202.

Further, air may exit the air passageway outlets 1420 at a plurality of angles or directions. For example, the air may be injected in a direction towards the center of the interior cavity 1400 or the air passageway outlets 1420 may be angled towards the sidewall 1406 to induce a swirling motion within the interior cavity 1400. Additionally, although FIG. 18 illustrates that the air passageway outlets 1420 may be flush with and/or adjacent to the bottom end 1402 of the interior cavity 1400, in some examples, the air passageway outlets 1420 may be spaced above from the bottom end 1402 of the interior cavity 1400. For instance, the air passageway outlets 1420 may be centrally disposed between the bottom end 1402 and the impinging surface 1412 to radially mix with the reductant. In mixing with the air, the reductant solution may funnel towards the chamber 1410, as shown by arrows 1810. In the chamber 1410, the reductant solution may further mix and exit the nozzle 116.

INDUSTRIAL APPLICABILITY

The exhaust system of the present disclosure may be used with any power system having a treatment system to reduce the amount of harmful emissions generated from internal-combustion engines. More particularly, nozzles of the present disclosure may be used in any liquid/gas mixing operation, where efficient, even, and thorough mixing of reductant, air, and exhaust is desired. Although applicable to a range of treatment devices/systems, in some instances, the disclosed treatment system and/or nozzles may be utilized in conjunction with an SCR device. The disclosed nozzle assists in the reduction of $NO_x$ by effectively atomizing reductant, and dispersing a mixture of reductant and air in an exhaust gas flow of the engine.

As described above, in some examples the channels 126 may receive exhaust 102 and route the exhaust 102 towards the second end 120 of the nozzle 116. Additionally, the air channel 304 and the reductant channel 306 may receive air and reductant from the supply line 124, respectively. Within the nozzle 116, air and reductant may mix within an interior cavity 1400 to form a reductant solution. Spray channels are fluidly coupled to the interior cavity 1400 to disperse the reductant solution via spray channel outlets 210 located at the second end 120 of the nozzle 116. The channels 126 direct a portion of the exhaust 102 over the spray channel outlets 210 to remove reductant solution and to prevent reductant from crystallizing at the second end 120 of the nozzle 116. In some instances, the channels 126 may be helical about the longitudinal axis 208 of the nozzle and along a direction of the longitudinal axis 208 from the first end 118 to the second end 120 to create a swirling pattern, which may assist in atomizing reductant and/or removing residual reductant at the second end 120 of the nozzle 116. The channels 126 may reduce in cross-sectional area from the first end 118 to the second end 120 of the nozzle 116 to increase a velocity of the exhaust 102 passing through the channels 126. As such, the nozzle 116 may increase a mixing between reductant and air and may reduce crystallization of reductant within the nozzle 116 or exterior to the nozzle 116 (e.g., at the second end 120 of the nozzle 116). The nozzle 116 may also be manufactured from a single piece of material using 3D printing techniques to reduce manufacturing and/or assembly times.

It will be apparent to those skilled in the art that various modifications and variations can be made to the exhaust system of the present disclosure without departing from the scope of the disclosure. Other embodiments will be apparent to those skilled in the art from consideration of the specification and practice of the exhaust system disclosed herein. It is intended that the specification and examples be considered as exemplary only, with a true scope of the disclosure being indicated by the following claims and their equivalent.

What is claimed is:

1. A nozzle, comprising:
    a nozzle body including:
        a first end having a first inlet and a second inlet, the first inlet being fluidly connected to a first channel and the second inlet being fluidly connected to a second channel, the first and second channels being fluidly connected at a location spaced from the first end;
        a second end having a plurality of outlets, the second end being disposed opposite the first end along a longitudinal direction;
        a central longitudinal axis extending from the first end to the second end along the longitudinal direction; and
        an exterior surface extending from the first end of the nozzle body to the second end of the nozzle body, and extending about the central longitudinal axis;
    a housing disposed about the nozzle body and the central longitudinal axis, the housing including:
        a first end;
        a second end disposed opposite the first end of the housing along the longitudinal direction, the second end of the housing being disposed abutting the second end of the nozzle body, exposing a protruding spherical sector of the nozzle body;
        an interior surface extending from the first end of the housing to the second end of the housing, the interior surface of the housing facing the exterior surface of the nozzle body along a radial direction, the radial direction being perpendicular to the longitudinal direction; and
        an exterior surface facing away from the exterior surface of the nozzle body along the radial direction;
    a plurality of vanes disposed between the exterior surface of the nozzle body and the interior surface of the housing; and
    a plurality of channels disposed between the exterior surface of the nozzle body and the interior surface of the housing, wherein individual channels of the plurality of channels are defined at least in part by:
        pairs of adjacent vanes of the plurality of vanes;
        the exterior surface of the nozzle body; and
        the interior surface of the housing,
    wherein the first end of the housing and the exterior surface of the nozzle body define a radial gap therebetween along the radial direction, the radial gap being located at the first end of the housing along the longitudinal direction, the interior surface of the housing being in fluid communication with the exterior surface of the housing via the radial gap, wherein the first end of the housing is disposed between the first inlet and the second end of the nozzle body along the longitudinal direction, and the first end of the housing is disposed between the second inlet and the second end of the nozzle body along the longitudinal direction, wherein the plurality of vanes extends from an inlet end to an outlet end along the longitudinal direction, and the plurality of outlets is disposed between the inlet end of the plurality of vanes and the outlet end of the plurality of vanes along the longitudinal direction, and wherein each vane of the plurality of vanes converges into contact with adjacent vanes of the plurality of vanes at the central longitudinal axis along the radial direction and at the outlet end of the plurality of vanes along the longitudinal direction.

2. The nozzle of claim 1, wherein each vane of the plurality of vanes is helical about the central longitudinal axis of the nozzle.

3. The nozzle of claim 1, wherein:
    each vane of the plurality of vanes has a radially outermost surface;
    at the first end of the nozzle body, the radially outermost surface of each vane is spaced from the exterior surface of the nozzle body by a first distance; and
    at the second end of the nozzle body, the radially outermost surface of each vane is spaced from the exterior surface of the nozzle body by a second distance that is less than the first distance.

4. The nozzle of claim 1, wherein individual outlets of the plurality of outlets are disposed between adjacent sidewalls of individual vanes of the plurality of vanes.

5. The nozzle of claim 1, wherein:
    the second end of the housing defines an opening; and
    at least a portion of the second end of the nozzle body extends beyond the opening.

6. The nozzle of claim 4, wherein the second end of the housing is disposed between the inlet end of the plurality of vanes and the outlet end of the plurality of vanes along the longitudinal direction.

7. The nozzle of claim 1, wherein:
    at the first end of the nozzle body, individual channels of the plurality of channels define a first cross-sectional area; and
    at the second end of the nozzle body, the individual channels define a second cross-sectional area that is less than the first cross-sectional area.

8. The nozzle of claim 1, wherein:
    each vane has a first end and a second end spaced from the first end along the longitudinal direction;
    at the first end of each vane, the pairs of adjacent vanes of the plurality of vanes are separated by a first distance; and
    at the second end of each vane, the pairs of adjacent vanes are separated by a second distance that is less than the first distance.

9. An exhaust system, comprising:
an exhaust pipe configured to receive exhaust from an engine;
a nozzle located within the exhaust pipe, the nozzle comprising:
a nozzle body including:
a first end having a first inlet and a second inlet, the first inlet being fluidly connected to a first channel and the second inlet being fluidly connected to a second channel, the first and second channels being fluidly connected at a location spaced from the first end;
a second end having a plurality of outlets, the second end being disposed opposite the first end along a longitudinal direction;
a central longitudinal axis extending from the first end to the second end along the longitudinal direction; and
an exterior surface extending from the first end of the nozzle body to the second end of the nozzle body, and extending about the central longitudinal axis;
a housing disposed about the nozzle body and the central longitudinal axis, the housing including:
a first end;
a second end disposed opposite the first end of the housing along the longitudinal direction, the second end of the housing being disposed abutting the second end of the nozzle body, exposing a protruding spherical sector of the nozzle body;
an interior surface extending from the first end of the housing to the second end of the housing, the interior surface of the housing facing the exterior surface of the nozzle body along a radial direction, the radial direction being perpendicular to the longitudinal direction; and
an exterior surface facing away from the exterior surface of the nozzle body along the radial direction;
a plurality of vanes disposed between the exterior surface of the nozzle body and the interior surface of the housing; and
a plurality of channels disposed between the exterior surface of the nozzle body and the interior surface of the housing, wherein individual channels of the plurality of channels are defined at least in part by:
pairs of adjacent vanes of the plurality of vanes;
the exterior surface of the nozzle body; and
the interior surface of the housing,
wherein the first end of the housing and the exterior surface of the nozzle body define a radial gap therebetween along the radial direction, the radial gap being located at the first end of the housing along the longitudinal direction, the interior surface of the housing being in fluid communication with the exterior surface of the housing via the radial gap,
wherein the first end of the housing is disposed between the first inlet and the second end of the nozzle body along the longitudinal direction, and the first end of the housing is disposed between the second inlet and the second end of the nozzle body along the longitudinal direction,
wherein the plurality of vanes extends from an inlet end to an outlet end along the longitudinal direction, and the plurality of outlets is disposed between the inlet end of the plurality of vanes and the outlet end of the plurality of vanes along the longitudinal direction, and
wherein each vane of the plurality of vanes converges into contact with adjacent vanes of the plurality of vanes at the central longitudinal axis along the radial direction and at the outlet end of the plurality of vanes along the longitudinal direction.

10. The exhaust system of claim 9, wherein each outlet of the plurality of outlets is disposed between one of the pairs of adjacent vanes of the plurality of vanes.

11. The exhaust system of claim 9, wherein a first distance extending from the first end of the nozzle body to the second end of the nozzle body is greater than a second distance extending from the first end of the housing to the second end of the housing.

12. The exhaust system of claim 9, wherein:
individual vanes of the plurality of vanes include a radially outermost surface;
the radially outermost surfaces of the individual vanes are spaced from the exterior surface of the nozzle body, at the first end of the nozzle body, by a first distance; and
the radially outermost surfaces of the individual vanes are spaced from the exterior surface of the nozzle body, at the second end of the nozzle body, by a second distance that is less than the first distance.

\* \* \* \* \*